US012628258B2

(12) United States Patent
Garant et al.

(10) Patent No.: US 12,628,258 B2
(45) Date of Patent: May 12, 2026

(54) SYSTEM AND METHODS FOR CONTROLLING INTENSITY LEVEL AND COLOR OF LIGHTING DEVICES ACCORDING TO A SHOW

(71) Applicant: Lutron Technology Company LLC, Coopersburg, PA (US)

(72) Inventors: Henry Garant, Philadelphia, PA (US); Andrew Robert Heller-Jones, Philadelphia, PA (US); Dat Ho, Austin, TX (US); Charles Kelley, Austin, TX (US); Braeden Morrison, Boston, MA (US)

(73) Assignee: Lutron Technology Company LLC, Coopersburg, PA (US)

( * ) Notice: Subject to any disclaimer, the term of this patent is extended or adjusted under 35 U.S.C. 154(b) by 201 days.

(21) Appl. No.: 18/374,604

(22) Filed: Sep. 28, 2023

(65) Prior Publication Data

US 2024/0107648 A1 Mar. 28, 2024

Related U.S. Application Data

(60) Provisional application No. 63/410,951, filed on Sep. 28, 2022.

(51) Int. Cl.
*H05B 47/10* (2020.01)
*H05B 47/155* (2020.01)
*H05B 47/16* (2020.01)

(52) U.S. Cl.
CPC ........... *H05B 47/16* (2020.01); *H05B 47/155* (2020.01)

(58) Field of Classification Search
CPC ...... H05B 47/10; H05B 47/155; H05B 47/16; H05B 45/10; H05B 45/20
See application file for complete search history.

(56) References Cited

U.S. PATENT DOCUMENTS

| | | | |
|---|---|---|---|
| 7,697,925 | B1 | 4/2010 | Wilson et al. |
| 10,420,185 | B2 | 9/2019 | Biery et al. |
| 10,645,777 | B2 | 5/2020 | Casey et al. |
| 11,202,354 | B2 | 12/2021 | Sooch et al. |
| 11,375,591 | B2 | 6/2022 | Chaturvedi et al. |

(Continued)

FOREIGN PATENT DOCUMENTS

| | | | | |
|---|---|---|---|---|
| WO | 0105195 A1 | 1/2001 | | |
| WO | WO-2008067402 A2 * | 6/2008 | ........... | H05B 47/155 |

*Primary Examiner* — Jimmy T Vu
(74) *Attorney, Agent, or Firm* — Flaster Greenberg P.C.

(57) ABSTRACT

A lighting device may include one or more light sources, a load control circuit configured to control an amount of power delivered to each of the one or more light sources, and a control circuit for controlling the load control circuit to control an intensity level and a color of the cumulative light emitted by the one or more light sources. The control circuit may be configured to generate a show. For example, the control circuit may be configured to receive, via the communication circuit, show information and auxiliary information from a computing device in one or more messages. The control circuit may be configured to store the show information and the auxiliary information in memory of the lighting device. The control circuit may be configured to receive, via the communication circuit, a command to execute a show in a message, and in response, generate the show.

20 Claims, 14 Drawing Sheets

(56) References Cited

U.S. PATENT DOCUMENTS

| | | | | |
|---|---|---|---|---|
| 11,445,584 | B2 | 9/2022 | Barnes et al. | |
| 11,612,029 | B2 | 3/2023 | Harte et al. | |
| 11,617,243 | B2 | 3/2023 | Bhutani et al. | |
| 11,737,183 | B2 | 8/2023 | Casey et al. | |
| 11,743,985 | B2 | 8/2023 | Green et al. | |
| 11,871,495 | B2 | 1/2024 | Ho et al. | |
| 2013/0162168 | A1 | 6/2013 | Ostrovsky | |
| 2015/0035437 | A1* | 2/2015 | Panopoulos | B60L 53/12 315/291 |
| 2018/0077783 | A1* | 3/2018 | Sooch | H05B 45/28 |
| 2021/0357111 | A1 | 11/2021 | Alfonzo et al. | |
| 2022/0104329 | A1 | 3/2022 | Sooch et al. | |
| 2022/0258066 | A1 | 8/2022 | Choi et al. | |
| 2022/0341256 | A1 | 10/2022 | Casey et al. | |
| 2022/0342373 | A1 | 10/2022 | Ho et al. | |
| 2023/0319960 | A1 | 10/2023 | Casey | |
| 2024/0155751 | A1 | 5/2024 | Baker et al. | |

* cited by examiner

SYSTEM AND METHODS FOR CONTROLLING INTENSITY LEVEL AND COLOR OF LIGHTING DEVICES ACCORDING TO A SHOW

CROSS-REFERENCE TO RELATED APPLICATIONS

This application claims priority from Provisional U.S. Patent Application No. 63/410,951, filed Sep. 28, 2022, the entire disclosure of which is hereby incorporated by reference herein in its entirety.

BACKGROUND

A user environment, such as a residence or an office building for example, may be configured using various types of load control systems. A lighting control system may be used to control the lighting loads in the user environment. Each load control system may include various control devices, including input devices and load control devices. The load control devices may receive digital messages, which may include load control instructions, for controlling an electrical load from one or more of the load control devices. The load control devices may be capable of directly controlling an electrical load. The input devices may be capable of indirectly controlling the electrical load via the load control device. Examples of load control devices may include lighting control devices (e.g., a dimmer, a dimmer switch, an electronic switch, a ballast, or a light-emitting diode (LED) driver), a motorized window treatment, a temperature control device (e.g., a thermostat), an AC plug-in load control device, and/or the like. Examples of input devices may include remote control devices, occupancy sensors, daylight sensors, temperature sensors, and/or the like.

Lamps and displays using efficient light sources, such as light-emitting diodes (LED) light sources, for illumination are becoming increasingly popular in many different markets. LED light sources provide a number of advantages over traditional light sources, such as incandescent and fluorescent lamps. For example, LED light sources may have a lower power consumption and a longer lifetime than traditional light sources. In addition, the LED light sources may have no hazardous materials, and may provide additional specific advantages for different applications. When used for general illumination, LED light sources provide the opportunity to adjust the color (e.g., from white, to blue, to green, etc.) or the color temperature (e.g., from warm white to cool white) of the light emitted from the LED light sources to produce different lighting effects.

SUMMARY

As described herein, a lighting control system (e.g., any combination of a system controller, a computing device, a dimmer, a lighting control device, a lighting device, and/or non-lighting devices) may be configured to generate a show.

Lighting devices and lighting control systems are described herein. A lighting device may include one or more light sources, such as emitters, where each emitter is configured to emit light (e.g., at different colors). Further, in some examples, such as with a light-emitting diode (LED) drive, the lighting device may not include the emitters (e.g., the emitters may be separately provided). The lighting device may include a load control circuit, such as a drive circuit, that is configured to control an amount of power delivered to each of the one or more emitters. The lighting device may include a communication circuit configured to receive messages. The lighting device may include a control circuit for controlling the drive circuit to control an intensity level and a color of the cumulative light emitted by the one or more emitters. The control circuit may be configured to generate a show. For example, the control circuit may be configured to receive, via the communication circuit, show information and auxiliary information from a computing device in one or more messages. The control circuit may be configured to store the show information and the auxiliary information in memory of the lighting device (e.g., non-volatile memory). The control circuit may be configured to receive, via the communication circuit, a command to execute a show in a message (e.g., a command message that, for instance, may be different from the one or more messages that provide the show information and/or auxiliary information). The control circuit may be configured to control the drive circuit to control the intensity level and the color of the cumulative light emitted from the one or more emitters with respect to time to generate the show. The intensity level and the color of the cumulative light emitted from the one or more emitters may be determined using a function that is dependent upon the show information and the auxiliary information stored in the memory of the lighting device.

The show information may define a relationship of intensity values with respect to time over a time duration for the show and a relationship of color values with respect to time over the time duration for the show. For example, the show information is defined by one or more tracks, where each track defines a relationship of a characteristic of the light emitted from the one or more emitters over time, and where the characteristic of the light comprises intensity level or color. For example, one track of the one or more tracks may define a correlated color temperature (CCT) value over time. A track of the one or more tracks may define an x-chromaticity coordinate value over time and a y-chromaticity coordinate value over time. A track of the one or more tracks may define a red value over time, a green value over time, and a blue value over time.

The control circuit may be configured to control the drive circuit for controlling the intensity level and the color of the cumulative light emitted from the one or more emitters at a plurality of different times during a time duration for the show. The intensity level and the color of the light emitted from the one or more emitters at the plurality of different times during the time duration for the show may be a function of the show information and the auxiliary information stored in the memory.

In some examples, the function by which the intensity level and the color of the cumulative light emitted from the one or more emitters of the show is determined is a spline function. For example, the show information received by the control circuit may include one or more breakpoints for the spline function. The control circuit may be configured to generate one or more default tracks using the breakpoints of spline function comprised within the show information, where each default track may define a relationship of a characteristic of the light emitted from the one or more emitters over time, and where the characteristic of the light comprises intensity level or color. For example, the control circuit may be configured to generate one or more counterpart tracks from the default tracks using the auxiliary information stored in memory.

A start time of the show may be relative to a time that the command to execute the show is received at the lighting device.

The auxiliary information may include a time duration for the show. In such examples, the control circuit may be configured to control the drive circuit to control the intensity level and the color of the cumulative light emitted from the one or more emitters with respect to time to repeat the show at the conclusion of the time duration in response to the command. In some examples, the auxiliary information may include a time duration for the show. Changes to the time duration may affect a frequency of the show (e.g., flicker could be faster or slower based on different time durations). In some examples, the auxiliary information may include a time offset, that indicates a time delay that the lighting device is to apply to start of the show relative to the receipt of the command. In some examples, the auxiliary information may include an intensity adjustment value associated with the show, and the show information may indicate a default intensity level. In such examples, the control circuit may be configured to adjust the default intensity level based on the intensity adjustment value. In some examples, the auxiliary information may include a color offset that indicates a change to the color defined by the show information.

The auxiliary information may be specific for the lighting device, such that different auxiliary information is provided to at least one other lighting device.

The control circuit may be configured to, in response to the command, retrieve the show information and the auxiliary information from the memory of the lighting device prior to controlling the drive circuit to control the intensity level and the color of the cumulative light emitted from the one or more emitters with respect to time to generate the show.

The communication circuit may include a wireless communication circuit and the command is received via a wireless signal from the computing device or from a dimmer switch.

The lighting device may be configured to be coupled to an alternating-current (AC) power source for receiving an AC mains line voltage, and the control circuit may be configured execute the show in response to the reception of the command to execute the show and based on one or more zero-crossings of the AC main line voltage.

The show information may define predefined illumination content that is stored in memory of the lighting device prior to the reception of the command to execute the show. In some examples, the predefined illumination content may include illumination instructions that causes the plurality of lighting devices to emit light that mimics a cycling rainbow, mimics candlelight flickers, mimics sunlight shining through a forest canopy, mimics a beathing pattern, or mimics a weather show.

The control circuit may be configured to adjust the color and/or intensity level of the light while executing the show. For example, the control circuit may receive an adjustment command during a time duration for the show defined by the auxiliary information, where the adjustment command comprises a command to adjust a characteristic of the emitted light, such as the intensity level or the color of the emitted light. The control circuit may be configured to control the drive circuit for adjusting the characteristic of the emitted light during the time duration based on the adjustment command.

The show may be defined by a combination of emitted light from a plurality of lighting devices. The default show may be defined by the show information. The counterpart show may be defined by a combination of the show information and the auxiliary information received by the lighting device.

The control circuit may be configured to alter a default show based on the auxiliary information. The default show may be determined based on the show information.

The control circuit may be configured to control the drive circuit for controlling the intensity level and color of the emitted light from the emitter over a time duration based on the show and the auxiliary information stored in the memory of the lighting device based on the reception of a single command to execute the show.

In some examples, the control circuit may be configured to control, in response to the command and based on the show information and the auxiliary information stored in the memory, the drive circuit for controlling the intensity level and the color of the light emitted from the one or more emitters over the time duration defined by the auxiliary information.

Described herein are examples of lighting control systems. The lighting control system may include one or more (e.g., a plurality) of lighting devices (e.g., as described above). The lighting control system may include a computing device (e.g., at least one computer-readable storage medium comprising executable instructions). The computing device may include a system controller, a smart-hub, and/or a user device (e.g., a mobile device, such as a smartphone, tablet, etc.). The computing device (e.g., computer-readable storage medium) may be configured to send show information and auxiliary information associated with a show to each of a plurality of lighting devices.

When executing the show, the control circuit of each lighting device of the plurality of lighting devices may be configured to control their respective drive circuit for controlling the intensity level and the color of the light emitted from the one or more emitters independently from the other lighting devices of the plurality of lighting devices.

The lighting devices may be configured to generate respective counterpart shows, where the combination of all counterpart shows may make up the show. For instance, in some examples, a control circuit of a first lighting device may be configured to receive a first show information and first auxiliary information from the computing device, and control, in response to the command and based on the first show information and the first auxiliary information stored in the memory of the first lighting device, the drive circuit for controlling the intensity level and the color of the light emitted from the one or more emitters over time as defined by the first show information or the first auxiliary information. A control circuit of a second lighting device may be configured to receive a second show information and second auxiliary information from the computing device, and control, in response to the command and based on the second show information and the second auxiliary information stored in the memory of the second lighting device, the drive circuit for controlling the intensity level and the color of the light emitted from the one or more emitters over time as defined by the second show information or the second auxiliary information.

In addition to and/or in alternative to a plurality of lighting devices, the system may include non-lighting devices, such as audio devices. For example, an audio device may be configured to receive show information (e.g., audio specific show information) and audio device specific auxiliary information from the computing device in one or more messages. The audio device may be configured to store the show information and the audio device specific auxiliary information in memory of the audio device. The audio device may be configured to receive a command to execute a show in a message (e.g., the command may be the same command that is received by the lighting device(s)). The audio device may be configured to control, in response to the command, power delivered to one or more speakers of the audio device based on the show information and the audio device specific auxiliary information stored in the memory of the audio device.

A non-lighting device may be configured to receive show information (e.g., non-lighting device specific show information) and auxiliary information from the computing device in one or more messages. The non-lighting device may be configured to store the show information and the auxiliary information in memory of the non-lighting device. The non-lighting device may be configured to receive a command to execute a show in a message. The non-lighting device may be configured to control, in response to the command, a non-lighting output of the non-lighting device based on the show information and the auxiliary information stored in the memory of the non-lighting device.

DETAILED DESCRIPTION

Figure 1A:
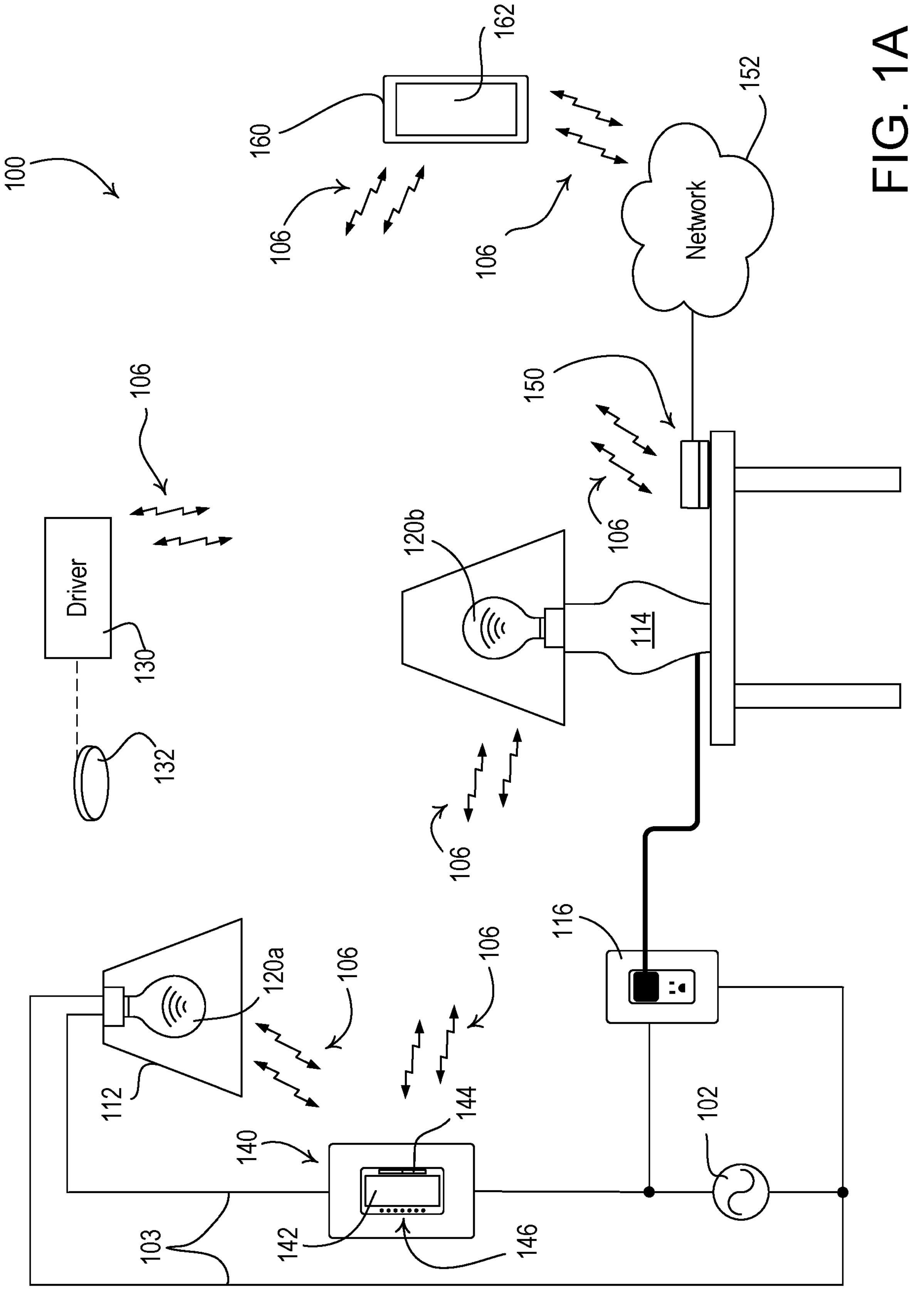
FIG. 1A depicts an example load control system that include one or more control devices and one or more smart lighting devices.

FIG. 1A is a simplified block diagrams of example load control system 100 (e.g., a lighting control system). FIG. 1A depicts an example of a lighting control system 100 having a plurality of lighting devices, such as at least one smart lighting device (e.g., smart bulbs 120*a*, 120*b*). As shown, the smart bulb 120*a* may be installed in a ceiling-mounted downlight fixture 112 and the smart bulb 120*b* may be installed in a tabletop lighting fixture 114, such as a lamp (e.g., table lamp). The smart bulbs 120*a*, 120*b* shown in FIG. 1A may include light sources of different types (e.g., incandescent lamps, fluorescent lamps, and/or light-emitting diode (LED) light sources). Other examples of lighting devices may include a light-emitting diode (LED) driver with a dedicated light source(s). Further, although described primarily in the context of lighting devices, the system 100 may include other load control devices, such as motor drive units that are configured to control the position and/or speed of movement of a motorized window treatment, a driver that is configured to control the volume or other characteristics of music or sound emitted by a speaker, etc.

The smart bulbs 120*a*, 120*b* may be capable of transmitting and/or receiving wireless communications. For example, the smart bulbs 120*a*, 120*b* may each include a wireless communication circuit (e.g., a radio frequency (RF) transceiver) operable to transmit and/or receive wireless signals such as RF signals 106 using a wireless protocol, for example, a standard wireless protocol (e.g., such as the ZIGBEE, Z-WAVE, THREAD, BLUETOOTH, BLUETOOTH LOW ENERGY (BLE), WI-FI, or MATTER protocols) or a proprietary wireless protocol, such as the CLEAR CONNECT protocol (e.g., the CLEAR CONNECT TYPE A and/or CLEAR CONNECT TYPE X protocols). The smart bulbs 120*a*, 120*b* may be configured to communicate according to one or more proprietary and/or standardized wireless communication standards. One or more of the smart bulbs 120*a*, 120*b* may have advanced features. For example, one or more of the smart bulbs 120*a*, 120*b* may be controlled to emit light of varying intensity levels and/or colors (e.g., color temperatures, such as correlated color temperatures (CCTs), and/or other colors) in response to control instructions received in messages (e.g., digital messages) from another control device.

The smart bulb 120*a* may be configured to determine whether to respond to phase-control or digital control messages (e.g., from a dimmer 140). For example, the smart bulb 120*a* may determine that the dimmer 140 is generating a phase-control signal (e.g., phase-control signals). Alternatively or in addition, the smart bulb 120*a* may receive a configuration message from the dimmer 140. In response to receiving the configuration message, the smart bulb 120*a* may determine to control an amount of power delivered to its light source in accordance with control messages (e.g., wireless control messages) received from the dimmer 140.

The lighting control system 100 may include one or more additional lighting devices, such as a light-emitting diode (LED) driver 130 for driving an LED light source 132 (e.g., an LED light engine). The LED driver 130 may be located in or adjacent to the lighting fixture of the LED light source 132. The LED driver 130 may be configured to receive digital messages via the RF signals 106 (e.g., from a system controller 150, a computing device 160, and/or the dimmer 140) and to control the LED light source 132 in response to the received digital messages. The LED driver 130 may be configured to communicate according to one or more proprietary and/or standardized wireless communication standards. The LED driver 130 may be configured to adjust the color temperature of the LED light source 132 in response to the received digital messages. Examples of LED drivers configured to control the color temperature of LED light sources are described in greater detail in commonly-assigned U.S. Pat. No. 9,538,603, issued Jan. 3, 2017, entitled SYSTEMS AND METHODS FOR CONTROLLING COLOR TEMPERATURE, the entire disclosure of which is hereby incorporated by reference. The lighting control system 100 may further comprise other types of load control devices, such as, for example, electronic dimming ballasts for driving fluorescent lamps. In some examples, a load control device may be a device or circuit for controlling an external load (e.g., an LED driver, a dimmer, a switching device for controlling an appliance, a thermostat, etc.). In some examples, a lighting device may be a device that includes a lighting control device/circuit and a light source (e.g., a controllable lamp (e.g., smart bulb), a linear lighting device, the internal circuitry of a lighting fixture (e.g., a LED driver and one or more dedicated LED light sources), etc.). In some examples, a fixture may be a mechanical enclosure along with the internal lighting device.

The lighting devices (e.g., the smart bulbs 120*a*, 120*b*, and/or the LED driver 130) may be configured to control the color temperature (e.g., the correlated color temperature (CCT)) of the cumulative light emitted by the lighting device to be equal to a target color temperature $T_{TRGT}$. The lighting device (e.g., a control circuit of the lighting device) may determine how to mix (e.g., the mix may include a lumen value for each emitter circuit) the light emitted by a plurality (e.g., two) emitter circuits (e.g., LEDs) of the lighting device to cause the correlated color temperature of the cumulative light emitted by the lighting device to be equal to the target color temperature $T_{TRGT}$. For example, the lighting device may be configured to weigh the amount of power delivered each emitter circuit to generate the target color temperature $T_{TRGT}$ to, for example, weigh the mixing of the color temperatures of each emitter and cause the color temperature of the cumulative light emitted by the lighting device to be equal to the target color temperature $T_{TRGT}$. For instance, the lighting device may control the magnitudes of respective drive currents conducted through the emitter circuits to specific magnitudes based on, for example, the target color temperature $T_{TRGT}$, the target intensity level $L_{TRGT}$, and/or the specific correlated color temperature of each emitter circuit. For example, the lighting device may determine the magnitude of the drive currents based on the lumen values needed from each emitter circuit to generate the target color temperature $T_{TRGT}$. The lighting device may use a table (e.g., stored in memory) and/or one or more equations to determine the lumen values and/or the magnitude of the drive currents necessary to cause the correlated color temperature of the cumulative light emitted by the lighting device to be equal to the target color temperature $T_{TRGT}$. Alternatively, the system may send, to the lighting device, the lumen values and/or the magnitude of the drive currents necessary to cause the correlated color temperature of the cumulative light emitted by the lighting device to be equal to the target color temperature $T_{TRGT}$.

The lighting control system 100 may comprise a control device, such as the dimmer 140, that is electrically coupled in series between an alternating-current (AC) power source 102 and the smart bulb 120*a*, such that the smart bulb 120*a* may receive power from the AC power source 102 via the dimmer 140. Alternatively, in some examples, the dimmer 140 may operate as a remote control device and may not be coupled in series between an alternating-current (AC) power source 102 and the smart bulb 120*a*. Rather, when configured as a remote control device, the dimmer 140 may be installed overtop of an existing switch that is coupled in series between an alternating-current (AC) power source 102 and the smart bulb 120*a*, may be installed on a tabletop stand or the wall, or may be otherwise configured within the lighting control system. The tabletop lighting fixture 114 may be plugged into an electrical receptacle 116 that is electrically coupled to the AC power source 102, such that the smart bulb 120*b* may receive power from the AC power source 102. Though the smart bulbs 120*a*, 120*b* are shown in FIG. 1A, any number of non-smart and smart bulbs may be supported in the lighting control system 100.

The dimmer 140 may be configured to transmit messages via the RF signals 106 for controlling the smart bulbs 120*a*, 120*b* and/or the LED driver 130. The dimmer 140 may include a wireless communication circuit that is configured to transmit and/or receive wireless signals such as RF signals 106. For example, the dimmer 140 may be configured to transmit messages to load control devices (e.g., the smart bulbs 120*a*, 120*b* and/or the LED driver 130) that are within a wireless communication range of the dimmer 140 via the RF signals 106. The dimmer 140 may be configured to communicate according to one or more proprietary and/or standardized wireless communication standards.

The lighting control system 100 may include one or more control devices for controlling the smart bulbs 120*a*, 120*b* (e.g., controlling an amount of power delivered to the light sources of the bulbs) and/or non-lighting control devices (e.g., speakers, motorized window treatments, etc., as described herein). The smart bulbs 120*a*, 120*b* may be controlled substantially in unison, or be controlled individually. For example, the smart bulbs may be zoned so that the smart bulb 120*a* may be controlled by a first control device, while the smart bulb 120*b* may be controlled by a second control device. The control devices may be configured to turn the smart bulbs 120*a*, 120*b* on and off. The control devices may be configured to control an intensity level of each of the smart bulbs 120*a*, 120*b* between a low-end intensity level $L_{LE}$ and a high-end intensity level $L_{HE}$, for example. The control devices may be configured to control a color (e.g., a color temperature) of light emitted by the smart bulbs 120*a*, 120*b*.

The dimmer 140 may be configured to be responsive to a user input and generate control instructions (e.g., a wired and/or wireless control signal) for controlling the smart bulb 120*a* and/or 120*b* based on the user input. The dimmer 140 may include a toggle actuator 142, a level-adjustment actuator 144, and/or a plurality of visible indicators 146. The dimmer 140 may turn the smart bulbs 120*a*, 120*b* on and off in response to actuations of the toggle actuator 142, and/or adjust the intensity level of the smart bulbs 120*a*, 120*b* in response to actuations of the level-adjustment actuator 144. In some examples, the dimmer 140 may adjust a phase-angle of the phase-control signal to adjust the intensity level of the smart bulbs 120*a* in response to actuation of the level-adjustment actuator 144. The dimmer 140 may generate the phase-control signal via various phase-control techniques (e.g., a forward phase-control dimming technique, a reverse phase-control dimming technique, a center phase-control technique, a notch phase-control technique, and/or a multi-phase-control technique). The plurality of lighting indicators 146 may include one or more internal light sources (e.g., LEDs) configured to be illuminated to provide feedback to a user of the smart dimmer 140. Such feedback may indicate, for example, a status of the smart bulbs 120*a*, 120*b*, such as whether the light sources of the smart bulbs 120*a*, 120*b* are on or off, a present intensity level of the smart bulbs 120*a*, 120*b*, and so on. The feedback may indicate a status of the dimmer 140 itself such as a power status of the dimmer 140.

A user may install a smart lighting device (e.g., such as the smart bulb 120*a*) on a circuit 103 that is controlled by the dimmer 140. As such, the smart lighting device (e.g., the smart bulb 120*a*) may include one or more features that are not available when controlled by a load control device. For example, advanced features, such as full-range dimming, adjustable dimming control (e.g., use of multiple and/or adjustable dimming control curves), color control, and/or other advanced features, may not be available when the smart lighting device (e.g., the smart bulb 120*a*) is controlled by a load control device. The intensity level of the smart lighting device (e.g., smart bulb 120*a*) may be similarly controlled by the phase-control signal received from the dimmer 140.

The lighting control system 100 may also include a system controller 150 and/or a computing device 160 (e.g., a mobile device, such as a smart phone or a tablet). The system controller 150 may be configured to transmit and/or receive communication signals (e.g., the RF signals 106). The system controller 150 may be configured to transmit messages (e.g., digital messages) to the smart bulbs 120*a*, 120*b* for controlling the smart bulbs 120*a*, 120*b*, and/or transmit messages to the LED driver 130 for controlling the LED light source 132. The system controller 150 may communicate via one or more types of RF communication signals, such as RF signals 106 using a wireless protocol (e.g., such as a standard or proprietary wireless protocol). The system controller 150 may be configured to communicate according to one or more proprietary and/or standardized wireless communication standards.

The system controller 150 may be connected to a network 152, e.g., via a wired or wireless communication link. The system controller 150 may be configured to communicate messages with the computing device 160 (e.g., a mobile device, such as a smart phone or a tablet) via RF signals 106 transmitting through the network 152. The system controller 150 may be configured to receive messages including commands for controlling the smart bulbs 120*a*, 120*b* from the computing device 160 via the network 152 and/or transmit messages via the network 152 for providing data (e.g., status information) to the computing device 160 and/or other external devices.

The computing device 160 may be configured to transmit and/or receive communication signals (e.g., the RF signals 106). The computing device 160 may be configured to transmit messages (e.g., digital messages) to the smart bulbs 120*a*, 120*b* for controlling the smart bulbs 120*a*, 120*b*, and/or transmit messages to the LED driver 130 for controlling the LED light source 132. The computing device 160 may communicate via one or more types of RF communication signals, such as RF signals 106 using a wireless protocol (e.g., such as a standard or proprietary wireless protocol). The computing device 160 may be configured to communicate according to one or more proprietary and/or standardized wireless communication standards.

The computing device 160 may be located on an occupant, for example, may be attached to the occupant's body or clothing or may be held by the occupant. The computing device 160 may be characterized by a unique identifier (e.g., a serial number or address stored in memory) that uniquely identifies the computing device 160. Examples of personal computing devices may include a smart phone, a laptop, and/or a tablet device. Examples of wearable wireless devices may include an activity tracking device, a smart watch, smart clothing, and/or smart glasses. In addition, the system controller 150 may be configured to communicate via the network with one or more other control systems (e.g., a building management system, a security system, etc.).

The computing device 160 may be configured to transmit messages to the system controller 150, for example, in one or more Internet Protocol packets. For example, the computing device 160 may be configured to transmit messages to the system controller 150 over the network 152 and/or via the Internet. The computing device 160 may be configured to transmit messages over the Internet to an external service, and then the messages may be received by the system controller 150.

The lighting control system 100 may comprise other types of computing devices coupled to the network, such as a desktop personal computer (PC), a wireless-communication-capable television, or any other suitable Internet-Protocol-enabled device. Examples of load control systems operable to communicate with mobile and/or computing devices on a network are described in greater detail in commonly-assigned U.S. Pat. No. 10,271,407, issued Apr. 23, 2019, entitled LOAD CONTROL DEVICE HAVING INTERNET CONNECTIVITY, the entire disclosure of which is hereby incorporated by reference.

The operation of the lighting control system 100 may be programmed and configured using, for example, the computing device 160. The computing device 160 may execute for allowing a user to generate system configuration data (e.g., stored a system configuration database) that may define how the lighting control system 100 operates (e.g., will operate after installation and commissioning). For example, the configuration software may be a graphical user interface (GUI) software that may run as a PC application, a web interface, and/or an application interface on the computing device 160. The configuration software may be executed locally at the computing device 160 and/or on the system controller 150. For example, the configuration software may be executed as a local application on the computing device 160 that communicates with the system controller 150, the load control devices, the lighting devices and/or the other devices of the load control system 100 to operate as described herein. In another example, the configuration software may execute on the system controller 150 and may be displayed on the computing device 160 via a local application (e.g., a browser) for displaying the GUI. Portions of the system configuration data may be stored on the system controller 150, the load control devices, the lighting devices and/or the other devices of the load control system 100.

The configuration software and/or the system controller 150 (e.g., via instructions from the configuration software) may generate the system configuration data that may include a load control dataset that defines the operation of the lighting control system 100 (e.g., shows, auxiliary information, etc.). For example, the load control dataset may include information regarding the operational settings of different load control devices of the lighting control system 100 (e.g., the smart bulbs 120*a*, 120*b*, the LED driver 130 for driving the LED light source 132, etc.). The load control dataset may comprise information regarding how the load control devices respond to inputs received from the input devices. In addition, the system configuration data may include a floorplan on the space and/or building in which the load control system 100 is installed. The system configuration data may include one or more icons that define locations of lighting devices and/or load control devices on the floorplan. In some examples, the configuration software may display the floorplan with icons on a display of the computing device 160, and may be configured to receive user inputs that allow for configuring and/or controlling the lighting devices and/or load control devices associated with the icons. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; and U.S. Pat. No. 10,027,127, issued Jul. 17, 2018, entitled COMMISSIONING LOAD CONTROL SYSTEMS, the entire disclosures of which are hereby incorporated by reference.

Figure 1B:
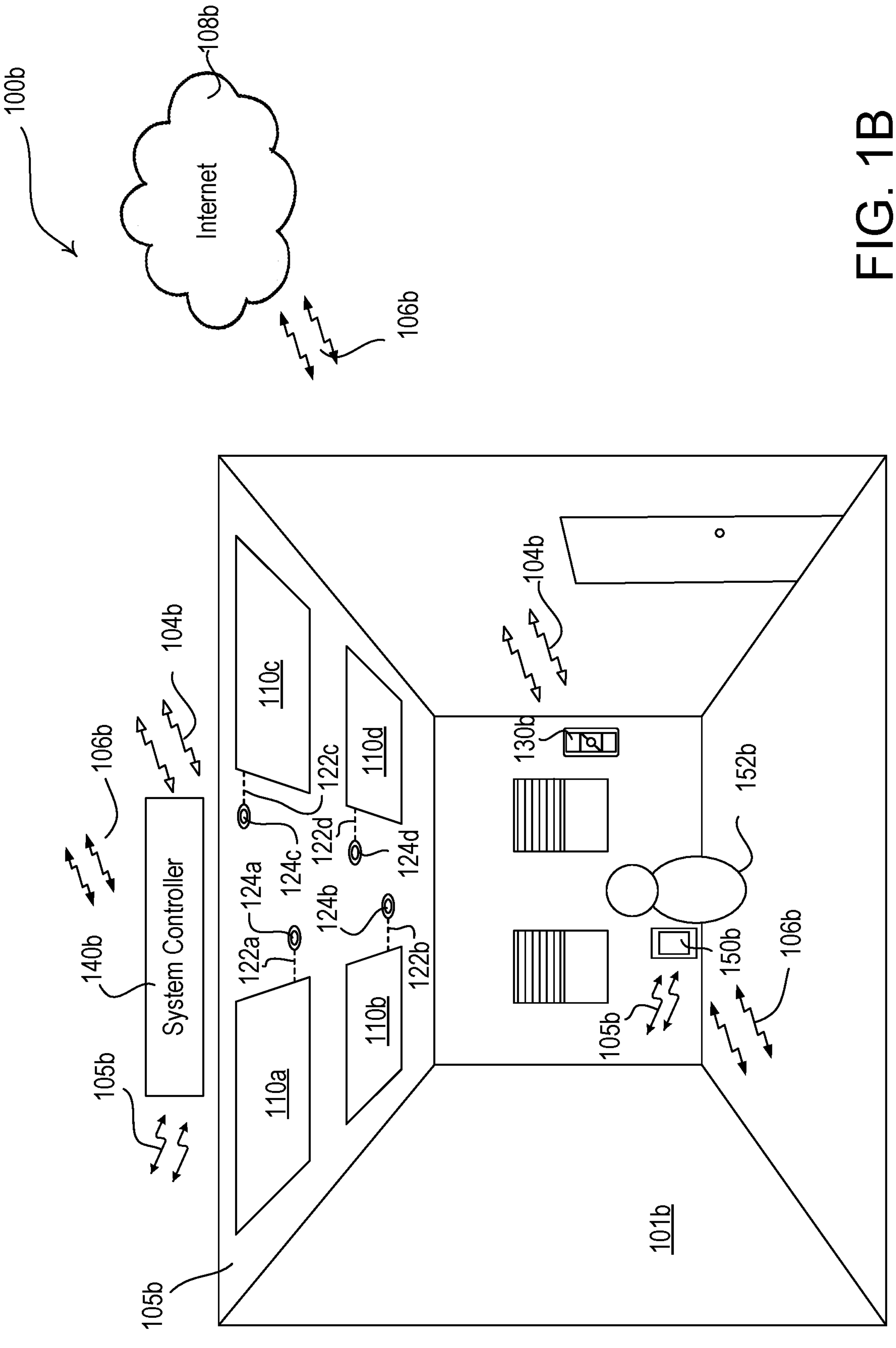
FIG. 1B depicts another example load control system that include one or more control devices and one or more smart lighting devices.

FIG. 1B is a diagram of an example load control system 100*b* for controlling the amount of power delivered from an alternating-current (AC) power source (not shown) to one or more electrical loads. The load control system 100*b* may be installed in a load control environment, such as a room 101*b* of a building. The load control system 100*b* may comprise a plurality of control devices configured to communicate with each other via wireless signals, e.g., radio-frequency (RF) signals 104*b*, 105*b*. For example, the load control system 100*b* may include control-source devices, control-target devices, and/or a system controller 140*b* that may be configured to transmit and receive the RF signals 104*b*, 105*b*. The RF signals 104*b*, 105*b* may use a proprietary RF protocol, such as the CLEAR CONNECT protocol (e.g., the CLEAR CONNECT TYPE A protocol and/or the CLEAR CONNECT TYPE X protocol as developed by Lutron Electronics Co., Inc.). Alternatively, the RF signals 104*b*, 105*b* may be transmitted using a different RF protocol, such as, a standard protocol, for example, one of WI-FI, BLUETOOTH, BLUETOOTH LOW ENERGY (BLE), ZIGBEE, Z-WAVE, THREAD, KNX-RF, ENOCEAN RADIO protocols, or a different standard or proprietary protocol. Alternatively or additionally, the load control system 100*b* may comprise a wired digital communication link coupled to one or more of the control devices to provide for communication between the control devices.

The control devices of the load control system 100*b* may comprise a number of control source devices (e.g., input devices operable to transmit messages in response to receiving user inputs, detecting occupancy/vacancy conditions, measuring ambient light intensity level, etc.) and a number of control target devices (e.g., load control devices operable to receive messages and control electrical loads in response to the received messages). A single control device of the load control system 100*b* may operate as both a control-source and a control-target device. For example, the control-source device may be an originating device or intermediary device from which a message is originated and a control-target device may be a destination device or intermediary device to which the message is transmitted.

The lighting control system 100*b* may comprise one or more lighting fixtures 110*a*, 110*b*, 110*c*, 110*d* that may be installed in the room 101*b*, e.g., in a ceiling 102*b* of the room 101*b*. Each lighting fixture 110*a*-110*d* may include a lighting load (e.g., an LED light source) and a respective lighting control device (e.g., an LED driver, ballast, dimming or switching module, or any combination of such devices) for controlling the respective lighting load of the lighting fixture 110*a* 110*d*. The lighting control devices may be control-target devices configured to control a respective lighting load in response to control instructions received in digital messages.

The control-source devices of the load control system 100*b* may be used to control the lighting fixtures 110*a*-110*d*. The control-source devices may be input devices configured to communicate messages (e.g., digital messages) to the control-target devices of the load control system 100*b*, such as the lighting control devices in the lighting fixtures 110*a*-110*d*, e.g., via the RF signals 104*b*, 105*b*. The control-source devices may transmit the messages for controlling (e.g., indirectly controlling) the amount of power provided to the lighting loads by the respective lighting control devices in the respective lighting fixtures 110*a*-110*d*. The messages may include control instructions (e.g., load control instructions) or another indication that causes the lighting control devices to determine load control instructions for controlling the respective lighting loads. The control-sources devices of the load control system 100*b* may comprise, for example, a control device, such a remote control device 130*b*, which may be configured to transmit messages to the lighting control devices in the respective lighting fixture 110*a*-110*d* via the RF signals 104*b* in response to actuations of one or more buttons of the remote control device 130*b*.

The load control system 100*b* may include control modules (e.g., sensor devices and/or fixture controllers), such as control modules 124*a*, 124*b*, 124*c*, 124*d*. The control modules 124*a*-124*d* may each be mounted to the ceiling 102*b* of the room 101*b* adjacent to respective ones of the lighting fixtures 110*a*-110*d*. The control modules 124*a*-124*d* may each be electrically connected to a respective lighting control device within the lighting fixtures 110*a*-110*d* via a respective communication link 122*a*-122*d* (e.g., a wired communication link) for controlling lighting loads. The control modules 124*a*-124*d* may include one or more sensors (e.g., sensing circuits) for controlling the lighting loads within the respective lighting fixtures 110*a*-110*d*. For example, the control modules 124*a*-124*d* may include an occupancy sensing circuit (e.g., may operate as an occupancy sensor and/or a vacancy sensor) and/or a daylight sensing circuit (e.g., may operates as a daylight sensor). The control modules 124*a*-124*d* may be control-source devices that transmit digital messages to respective lighting control devices to which they are connected via the respective wired communication links 122*a*-122*d*. The control modules 124*a*-124*d* may also, or alternatively, be control-target devices for receiving digital messages from other devices in the system, such as the remote control device 130*b* or another control-source device, (e.g., on a wireless communication link via the RF signals 104*b*, 105*b*) for controlling the respective lighting control devices to which the control modules 124*a*-124*d* are connected.

The occupancy sensing circuit in the control modules 124*a*-124*d* may be configured to detect occupancy and/or vacancy conditions in the room 101*b* in which the load control system 100*b* is installed. The control modules 124*a*-124*d* may control the lighting control devices in the respective lighting fixtures 110*a*-110*d* in response to the occupancy sensors detecting the occupancy or vacancy conditions. The control modules 124*a*-124*d* may each also operate as a vacancy sensor, such that messages are transmitted in response to detecting a vacancy condition (e.g., messages may or may not be transmitted in response to detecting an occupancy condition). The daylight sensing circuit in the control modules 120*a* 120*d* may be configured to measure an ambient light intensity level in the visible area of the room 101*b* in which the load control system 100*b* is installed. The control modules 124*a*-124*d* may control the lighting control devices in the respective lighting fixture 110*a* 110*d* in response to the ambient light intensity level measured by the respective daylight sensing circuit.

The control modules 124*a*-124*d* may each comprise a memory or other computer-readable storage medium configured to store instructions thereon for being executed by a control circuit thereon. Each control module 124*a*-124*d* may store in the memory unique identifiers of other devices in the load control system 100*b* with which the control module is associated to enable recognition of messages from and/or transmission of messages to associated control devices. For example, each control module 124*a*-124*d* may store in the memory the unique identifier of the remote control device 130*b* with which the control module is associated and thus configured to be responsive to messages from remote control device 130*b*. Other control variations are possible.

The control modules 124*a*-124*d* may each comprise one or more wireless communication circuits for transmitting and/or receiving messages, e.g., via the RF signals 104*b*, 105*b*. A first wireless communication circuit of each of the control modules 124*a*-124*d* may be configured to communicate on a first wireless communication link (e.g., a wireless network communication link) and/or communicating using a first wireless protocol (e.g., a wireless network communication protocol, such as the CLEAR CONNECT and/or THREAD protocols) via the RF signals 104*b*. A second wireless communication circuit of each of the control modules 124*a*-124*d* may be configured to communicate on a second wireless communication link (e.g., a short-range wireless communication link) and/or communicating using a second wireless protocol (e.g., a short-range wireless communication protocol, such as the BLUETOOTH and/or BLUETOOTH LOW ENERGY (BLE) protocols) via the RF signals 105*b*. The first and second communication circuits may be separate modules or housed in a common module.

The control modules 124*a*-124*d* may each comprise one or more wired communication circuits for transmitting and/or receiving signals and/or messages via the respective communication links 124*a*-124*d* (e.g., wired power/communication links). For example, each control module 124*a*-124*d* may use the wired communication circuit to communicate messages with the respective lighting fixture 110*a*-110*d* via the respective communication link 122*a*-122*d*. Each of the communication links 122*a*-122*d* may be used for providing communications and/or power to/from each of the lighting fixtures 110*a*-110*d*. For example, each of the communication links 122*a*-122*d* may comprise, for example, a Digital Addressable Lighting Interface (DALI) link or another digital communication link. Each of the communication links 122*a*-122*d* may be used by the respective control module 124*a*-124*d* to transmit messages (e.g., including commands) to the respective lighting control devices of the respective lighting fixture 124*a*-124*d* for turning the respective lighting load on and/or off and controlling an intensity level and/or color (e.g., color temperature) of the respective lighting loads. Each control module 124*a*-124*d* may receive messages (e.g., including feedback information) from the respective lighting control device that indicate the on/off state, the intensity level, and/or the color of the respective lighting loads. In addition, the lighting control devices in each of the lighting fixtures 110*a*-110*d* may each receive power from an AC power source (not shown) and may each supply power to the respective control module 120*a* 120*d* via the respective communication link 122*a*-122*d*. Though each of the communication links 122*a*-122*d* may be described herein as a single link, each of the communication links 122*a*-122*d* may be comprised of multiple links. For example, the lighting control devices of each lighting fixture 110*a* 110*d* may provide power to the respective control module 124*a*-124*d* via a two-wire power bus, while communications may be performed between the control module and the lighting control devices using an analog communication link, such as a 0-10V control link or another communication link through which power may not be provided (e.g., an RS 485 digital communication link). While the control modules 124*a*-124*d* of FIG. 1B are described as including one or more sensors (e.g., sensing circuits) and one or more wireless communication circuits, the control module 124*a*-124*d* may also just comprise the one or more wireless communication circuits (e.g., one or more of the control modules 124*a*-124*d* may not include the sensors).

The load control system 100*b* may include a system controller 140*b* that is configured to transmit and/or receive messages via wired and/or wireless communications. For example, the system controller 140*b* may be configured to transmit and/or receive the RF signals 104*b*, to communicate with one or more control devices (e.g., control source devices and/or control target devices, such as the control modules 124*a*-124*d*). The system controller 140*b* may communicate digital messages between associated control devices that are configured to control or be controlled by the other. The system controller 14*b*0 may be coupled to one or more wired control devices (e.g., control source devices and/or control target devices) via a wired digital communication link. The system controller 140*b* may also, or alternatively, be configured to communicate on a second wireless communication link (e.g., a standard communication link) and/or communicating using a second wireless protocol (e.g., a standard communication protocol, such as the Internet protocol (IP) and/or WI-FI protocol), via RF signals 106*b*. For example, the system controller 140*b* may be configured to transmit and/or received messages on a network 108*b*, such as the Internet, via the RF signals 106*b*.

The system controller 140*b* may be configured to transmit and receive messages between control devices. For example, the system controller 140*b* may transmit messages to the control modules 124*a*-124*d* for controlling the lighting loads in the lighting fixtures 110*a*-110*d* in response to the messages received from the remote control device 130*b* (e.g., via the RF signals 104*b*). The messages may include configuration data for configuring the control devices (e.g., the control modules 124*a*-124*d*) and/or control data (e.g., commands) for controlling the lighting loads in the lighting fixtures 110*a*-110*d*.

The load control system 100*b* may be commissioned to enable control of the lighting loads in the lighting fixtures 110*a*-110*d* based on commands communicated from the control devices (e.g., the remote control device 130*b*) to the control modules 124*a*-124*d* for controlling the lighting loads in the lighting fixtures 110*a*-110*d*. For example, the remote control device 130*b* may be associated with the control modules 124*a*-124*d* of the lighting fixtures 110*a*-110*d*. Association information may be stored on the associated devices, which may be used to communicate and identify messages and/or commands at associated devices for controlling electrical devices in the load control system 100*b*. The association information may include the unique identifier of one or more of the associated devices. The association information may be stored at the control modules 124*a*-124*d*, the system controller 140*b*, or at other control devices that may be implemented to enable communication and/or identification of messages between the control devices.

A network device 150*b* may be in communication with the control modules 110*a*-110*d* and/or the system controller 140*b* for commissioning and/or controlling the control devices of the load control system 100*b*. The network device 150*b* may comprise a wireless phone, a tablet, a laptop, a personal digital assistant (PDA), a wearable device (e.g., a watch, glasses, etc.), or other computing device. The network device 150*b* may be operated by a user 152*b*. The network device 150*b* may be configured to communicate with the system controller 140*b* and/or control devices connected by transmitting and/or receiving messages using a standard wireless protocol (e.g., via the RF signals 106*b*) via the network 108*b*. In addition, the network device 150*b* may be configured to communicate with the control modules 110*a*-110*d* directly by transmitting and/or receiving messages via the short-range wireless communication link (e.g., using the RF signals 105*b*). Further, the network device 150*b* may be configured to transmit and/or receive beacon signals that may be used to commission the load control system 100*b* via the short-range wireless communication link (e.g., using the RF signals 105*b*).

One or more devices of the system (e.g., one or more lighting devices, load control devices (e.g., dimmer switches), non-lighting devices, and/or computing devices, such as a system controller or mobile device) may cause the lighting devices and/or other load control devices to control one or more characteristics of their respective loads according to a show. For example, with respect to lighting devices, the system may cause the lighting devices to control their respective emitters to emit light according to the show. The show may be a combination of changes of light emitted from a plurality of lighting devices (e.g., and/or sound from one or more speakers, movement of window treatments from one or more motorized window treatments, etc.) with respect to time. During a show, each lighting device may be configured to emit light according to respective counterpart shows, and the combination of all counterpart shows may make up the show.

As described in more detail below, the one or more lighting devices may be configured to receive and store show information and/or auxiliary information that, for example, may be used to enable a plurality of lighting devices to put on the coordinated show. The lighting device may store the show information and auxiliary information in memory of the lighting device (e.g., non-volatile and/or long-term memory). The lighting devices may be configured to execute the show in response to a command (e.g., a single command). Accordingly, the lighting devices may execute the show without having to stream discrete instructions from one or more external computing devices.

The show information may define predefined illumination content that is stored in memory of the lighting device prior to the reception of the command to execute the show. For example, the predefined illumination content may include illumination instructions that causes the plurality of lighting devices to emit light that mimics a cycling rainbow, mimics candlelight flickers, mimics sunlight shing through a forest canopy, mimics a beathing pattern (e.g., yoga/meditation/workout), or mimics a weather show (e.g., clouds moving, lightning striking, aurora borealis, night sky, etc.).

The show information may define relationships between characteristics of the light (e.g., an intensity value and/or one or more color values, such as a CCT value, XY chromaticity coordinate values, and/or RGB values, etc.) with respect to time over a time duration TsHow for the show. A characteristic of emitted light may include an intensity value of emitted light or a color value of emitted light. The color value of emitted light may refer to a CCT value of the emitted light, XY chromaticity coordinate values of the emitted light, and/or RGB values of the emitted light.

The auxiliary information may be specific for (e.g., unique to) each lighting device included in the show. For example, different auxiliary information may be provided to at least one other lighting device that is also configured to generate the show (e.g., to emit light according to the show information). As such, each lighting device may be configured to generate a counterpart show based on the show information and, is received, the auxiliary information that is specific to that device. The counterpart show may be defined as the combination of the show information (e.g., common to all lighting devices) and the auxiliary information (e.g., which may be specific to each lighting device). In response to receiving the command to execute the show, each lighting device may drive one or more emitters to emit light at a plurality of different intensity levels and/or colors over a time duration TsHow based on the show information and the auxiliary information (e.g., the respective counterpart show stored in memory in each lighting device). When the plurality of lighting devices all emit light according to their respective counterpart shows simultaneously, the plurality of lighting devices may generate the show.

Because the lighting device is able to generate the counterpart show using the show information and the auxiliary information, the lighting device may have stored thereon (e.g., in non-volatile and/or long-term memory) a complete mapping between a plurality of different intensity values with respect to time over the time duration TsHow of the show and/or a plurality of different color values with respect to time over the time duration TsHow of the show. Therefore, after the reception of the show information and/or auxiliary information, the lighting device does not, for example, need to stream a plurality of distinct intensity values and/or color values when executing the show.

The lighting device may be configured to start the show based on the reception (e.g., the time of the reception) of the command to execute the show. As such, the start time of the show may be relative to a time that the command to execute the show is received by the lighting device. Therefore, a plurality of lighting devices may be configured to coordinate the start of the show based on the reception of a single command. Further, each lighting device of the plurality of lighting devices may be configured with show information (e.g., which may be used to generate one or more default shows) and auxiliary information. The auxiliary information may be specific for (e.g., unique to) each respective lighting device. As such, each lighting device of the plurality of lighting devices may be configured to emit light having slightly different characteristics (e.g., intensity level, color, etc.) such that the combination of emitted light from all of the lighting devices generates a coordinated show.

Accordingly, a combination of lighting devices may be configured to generate a lighting scene based on the show information and the auxiliary information. The lighting scene may be a coordinated and orchestrated emission of light from the plurality of lighting devices. The lighting scene may include one or more lighting devices that are emitting light according to a show (e.g., possibly with different auxiliary information), and in some examples, may include one or more lighting devices that are emitting light according to a static setting (e.g., a static intensity level and/or color).

In some examples, the lighting device may be configured to be coupled to an AC power source for receiving an AC mains line voltage. In such examples, the lighting device may be configured execute the show in response to the reception of the command to execute the show and based on one or more zero-crossings of the AC main line voltage. For instance, the zero-crossings of the AC main line voltage may be used as a common timing mechanism so that a plurality of different lighting devices may coordinate the start of the show.

In some examples, the show information may be defined by one or more tracks (e.g., default tracks). A track may define a relationship of a characteristic (e.g., a single characteristic) of the light emitted from the one or more emitters (e.g., an intensity value and/or one or more color values, such as a CCT value, XY chromaticity coordinate values, and/or RGB values, etc.) over time. For example, the show information may define a first track that defines an intensity level over time $L_{SHOW}(t)$ for the show. In addition, the show information may define one or more other tracks that define the color (e.g., CCT value, XY chromaticity coordinate values, and/or RGB values) over time. For example, the one or more other tracks that define the color over time may comprise a CCT value over time $T_{SHOW}(t)$. In addition, the one or more other tracks that define the color over time may comprise an x-chromaticity coordinate value over time $X_{SHOW}(t)$ and a y-chromaticity coordinate value over time $Y_{SHOW}(t)$. Further, the one or more other tracks that define the color over time may comprise a red value over time $R_{SHOW}(t)$, a green value over time $G_{SHOW}(t)$, and a blue value over time $B_{SHOW}(t)$.

In some examples, the tracks defined by the show information may be generated using one or more functions. One example of a function that may be used to generate the tracks is a spline function, such as a basis spline function (e.g., a B-spline function). The spline function may be a piecewise polynomial function defined by a number of breakpoints (e.g., knots) where the pieces of the function connect. For instance, the show information may include a plurality of breakpoints for the spline function for each track defined by the show information, and the lighting device may be configured to generate the default tracks (e.g., $L_{SHOW}(t)$, $T_{SHOW}(t)$, $[X_{SHOW}(t), Y_{SHOW}(t)]$, $[R_{SHOW}(t), G_{SHOW}(t), B_{SHOW}(t)]$, etc.) based on the breakpoints and using the spline function. For example, when the show includes a plurality of lighting devices, the show information transmitted to each of the lighting devices may be identical, such that the lighting devices are able to generate the same default tracks for the show.

The lighting devices may use the auxiliary information to generate the counterpart shows from the default tracks determined from the show information. For example, different auxiliary information may be provided to at least one other lighting device that is also configured to generate the show (e.g., to emit light according to the show information). As such, the counterpart show may be defined as the combination of the show information (e.g., common to all lighting devices) and the auxiliary information (e.g., which may be specific to each lighting device).

The auxiliary information may include a time duration $T_{SHOW}$, a time offset value torr, a frequency adjustment value, an intensity adjustment value associated with the show, and/or a color offset associated with the show. The time duration $T_{SHOW}$ may indicate the length in time of each of the tracks of the counterpart shows. The time offset value $t_{OFF}$ may indicate a time delay that the lighting device is to apply to start of the show relative to the receipt of a command to execute the show. For instance, the lighting device may be configured, via the time offset value $t_{OFF}$, to start the show at a different time than one or more other lighting devices that are also configured to execute the show in response to the command (e.g., the same command). For example, the intensity track of a counterpart show may define an intensity level over time $L_{CP}(t)$, where $L_{CP}(t)=L_{SHOW}(t+t_{OFF})$. The frequency adjustment value may indicate whether the lighting device is to repeat the show and/or may indicate an adjustment to the frequency of which the lighting device repeats the show. In some examples, the frequency adjustment value may be a frequency adjustment scalar $\alpha_{FREQ}$, such that the intensity track of a counterpart show may define an intensity level over time $L_{CP}(t)$, where $L_{CP}(t)=L_{SHOW}([\alpha_{FREQ}\cdot f_{INIT}]\cdot t)$ and $f_{INIT}$ is an initial frequency of the show. The color offset may indicate a change to the color defined by the show information.

The intensity adjustment value may indicate a change in the intensity level over time $L_{CP}(t)$ of the intensity track of the counterpart show (e.g., as compared to the default track defined by the show information) that the lighting device is to apply when controlling the intensity level of the light emitted from the one or more emitters over the time duration $T_{SHOW}$ for the show. For example, the show information may indicate the default track, and the lighting device may be configured to generate the intensity track of the counterpart show based on the intensity adjustment value, for instance, so that the intensity level of the lighting device is different than the intensity level of the light emitted by one or more other lighting devices that are also configured to execute the show. For example, the intensity adjustment value may be an intensity adjustment offset $L_{OFF}$, which may be added to the intensity levels over time $L_{SHOW}(t)$ indicated by the default show to generate the intensity level over time $L_{CP}(t)$ of the intensity track of the counterpart show, e.g., $L_{CP}(t)=L_{SHOW}(t)+L_{OFF}$. For example, the intensity adjustment value may be an intensity adjustment scalar $L_{SC}$, which may be multiplied by the intensity levels over time $L_{SHOW}(t)$ indicated by the default show to generate the intensity level over time $L_{CP}(t)$ of the intensity track of the counterpart show, e.g., $L_{CP}(t)=L_{SC}\cdot L_{SHOW}(t)$.

Further, in some examples, the auxiliary information may include a randomization setting. For instance, the control circuit may use a randomization function to generate the counterpart show based on the randomization setting. For example, the control circuit may use the randomization function to generate the show when the show mimics candlelight flickers, mimics sunlight shing through a forest canopy, mimics a weather show, or mimics another pattern that is random or pseudo-random to ensure that the lighting devices executing the show do not fall into synchronization with one another. In some examples, the randomization setting may be an on/off setting that instructs the lighting device whether or not (e.g., or how much) to randomize one or more characteristics of emitted light (e.g., intensity level, specific color, and/or time (e.g., time offset or frequency)).

Further, as described in more detail herein, a user may be configured to adjust a characteristic of the emitted light (e.g., raise or lower intensity level, adjust color, etc.) during the show. For example, the user may be configured to adjust the characteristic of the emitted light using an actuator of the lighting device and/or via a graphical user interface (GUI) (e.g., of a computing device and/or external device). The lighting device may be configured to receive an adjustment command (e.g., an intensity level adjustment command, a color adjustment command, etc.) while the lighting device is executing the show (e.g., during the time duration $T_{SHOW}$ defined by the auxiliary information). The lighting device may be configured to control a load control circuit (e.g., a drive circuit) of the lighting device to adjust the characteristic of the light emitted from the one or more emitters during the time duration $T_{SHOW}$of the show based on the adjustment command (e.g., and further based on the show information and the auxiliary information stored in the memory). An adjustment command may include a command to adjust a characteristic of the emitted light, such as the intensity level or the color of the emitted light, that is to be performed along with the show information and/or the auxiliary information. That is, the adjustment command may be used to increase or decrease the intensity level and/or alter the color of the show independent from the show information and the auxiliary information. Further, although described in the context of intensity level and/or color, the adjustment command may indicate an adjustment to a start time of the show or a frequency of the show.

The computing device 160 and/or the system controller 150 may be configured to create, alter, and/or send the show information and/or the auxiliary information to the one or more lighting devices. The computing device 160 and/or the system controller 150 may be configured to automatically configure a plurality of different devices with the show information and/or the auxiliary information. In some examples, the computing device 160 and/or the system controller 150 may be configured to determine the show information and/or the auxiliary information based on the load type (e.g., the specific type of lighting device, the type of non-lighting device, etc.). In some examples, a user may be configured to alter the show information and/or the auxiliary information using the computing device 160 and/or the system controller 150.

In some examples, the computing device 160 and/or the system controller 150 may number each of the devices that are configured to generate the show, for example, through a commissioning step and/or based on their position on a communication bus (e.g., where applicable). The computing device 160 and/or the system controller 150 may configure the auxiliary information based on the numbering of devices, the positioning and/or location of the devices, and/or the types of devices that are configured to generate the show. In some instances, a user (e.g., an installer of the lighting control system 100) may assign a location (e.g., within a space or room) and/or a position (e.g., within sequential order of devices) to one or more of the devices, for example, by sequentially moving between devices to number them in order. For example, the computing device 160 and/or the system controller 150 may determine the relative location of the devices with respect to each other, for example, using a camera during a commissioning procedure.

In some examples, the computing device 160 and/or the system controller 150 may perform a location assignment procedure to assign a location and/or order to the lighting devices. For example, the computing device 160 and/or the system controller 150 may assign each lighting device a different order number $N_{ORDER}$. Alternatively or additionally, the computing device 160 and/or the system controller 150 may assign multiple lighting devices (e.g., two lighting devices) the same order number $N_{ORDER}$ (e.g., if the lighting devices are within a threshold distance to one another, such as within 6 inches of one another). Further, in some instances, the computing device 160 and/or the system controller 150 may skip an order number $N_{ORDER}$, such as when there might be a large distance between lighting devices (e.g., when the distance between the lighting devices exceeds a threshold distance). In such examples, the computing device 160 and/or the system controller 150 may calculate a time offset $t_{OFF}$ depending on the particular order number $N_{ORDER}$ for each lighting device (e.g., the time offset $t_{OFF}$ that is part of the auxiliary information assigned to each lighting device). For instance, the computing device 160 and/or the system controller 150 may calculate a time offset $t_{OFF}$ based on the particular order number $N_{ORDER}$ for the lighting device, a highest order number $N_{HI}$ of the assigned order numbers, and the time duration $T_{SHOW}$ of the show, e.g., $t_{OFF}=(T_{SHOW}/N_{HI})\cdot N_{ORDER}$.

In some examples, the computing device 160 and/or the system controller 150 may perform assign location information to the lighting devices using a floorplan and an augmented reality (AR) application that provides AR data to the computing device 160 and/or the system controller 150. For example, the computing device 160 and/or the system controller 150 may use the floorplan and/or the AR data to assign coordinates (e.g., XY coordinates) to the lighting device. Alternatively or additionally, the computing device 160 and/or the system controller 150 may use the floorplan and/or the AR data to assign an order number and/or a time offset $t_{OFF}$ to the lighting devices.

In some examples, the show may be generated based on an animated image (e.g., an animated Graphics Interchange Format (GIF) image). For example, as described herein, a user may select an animated image, and the device (e.g., a control device) may generate show information and auxiliary information based on the numbering of devices, the positioning (e.g., location) of the devices, and/or the types of devices that are configured to generate the show. As noted herein, in some instances, each lighting device may be assigned a location (e.g., within a space or room) and/or a position (e.g., within sequential order of devices). Then, based on the position and/or location of each lighting device, each lighting device may be assigned auxiliary information. In some examples, the show and the auxiliary information may be based on an animated image that is selected by a user.

Finally, although described with reference primarily to various characteristics of emitted light, the procedures described herein may be executed by devices that control characteristics of other load types, such as those described herein (e.g., speakers, motorized window treatments, etc.). Such non-lighting control devices may be configured to receive the show information and the auxiliary information. However, in such examples, the show information may define a relationship of a characteristic of the load type of the control device (e.g., frequency and/or volume of emitted sound from a speaker, position of a motorized window treatment, etc.) over time (e.g., over the time duration $T_{SHOW}$ of the show). Similarly, the auxiliary information may define some device-specific adjustment to one or more of the characteristics (e.g., adjustment to frequency and/or volume). The non-lighting control devices may be configured to store the show information and/or the auxiliary information in memory prior to the reception of a command to execute the show. Accordingly, some systems may include lighting control device and non-lighting control devices, and a computing device (e.g., a system controller) may be configured to coordinate a plurality of loads of various types to execute a show that includes, for example, the emission of light, the generation of sound, the movement of one or more objects (e.g., motorized window treatments in the space), etc., for example, based on the reception of a command (e.g., a single command).

It should be further appreciated that although FIG. 1A depicts a load control system with three lighting loads, the systems of FIG. 1A or FIG. 1B may include more lighting loads, other types of lighting loads, and/or other types of electrical loads. For example, the load control system may include one or more of the following: a dimming ballast for driving a gas-discharge lamp; an LED driver for driving an LED light source; a dimming circuit for controlling the intensity level of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; one or more motorized interior and/or exterior shutters; a thermostat for a heating and/or cooling system; a temperature control device for controlling a setpoint temperature of a heating, ventilation, and air-conditioning (HVAC) system; an air conditioner; a compressor; an electric baseboard heater controller; a controllable damper; a variable air volume controller; a fresh air intake controller; a ventilation controller; one or more hydraulic valves for use in radiators and radiant heating system; a humidity control unit; a humidifier; a dehumidifier; a water heater; a boiler controller; a pool pump; a refrigerator; a freezer; a television and/or computer monitor; a video camera; a volume control; an audio system or amplifier; an elevator; a power supply; a generator; an electric charger, such as an electric vehicle charger; an alternative energy controller; and/or the like.

Figure 2:
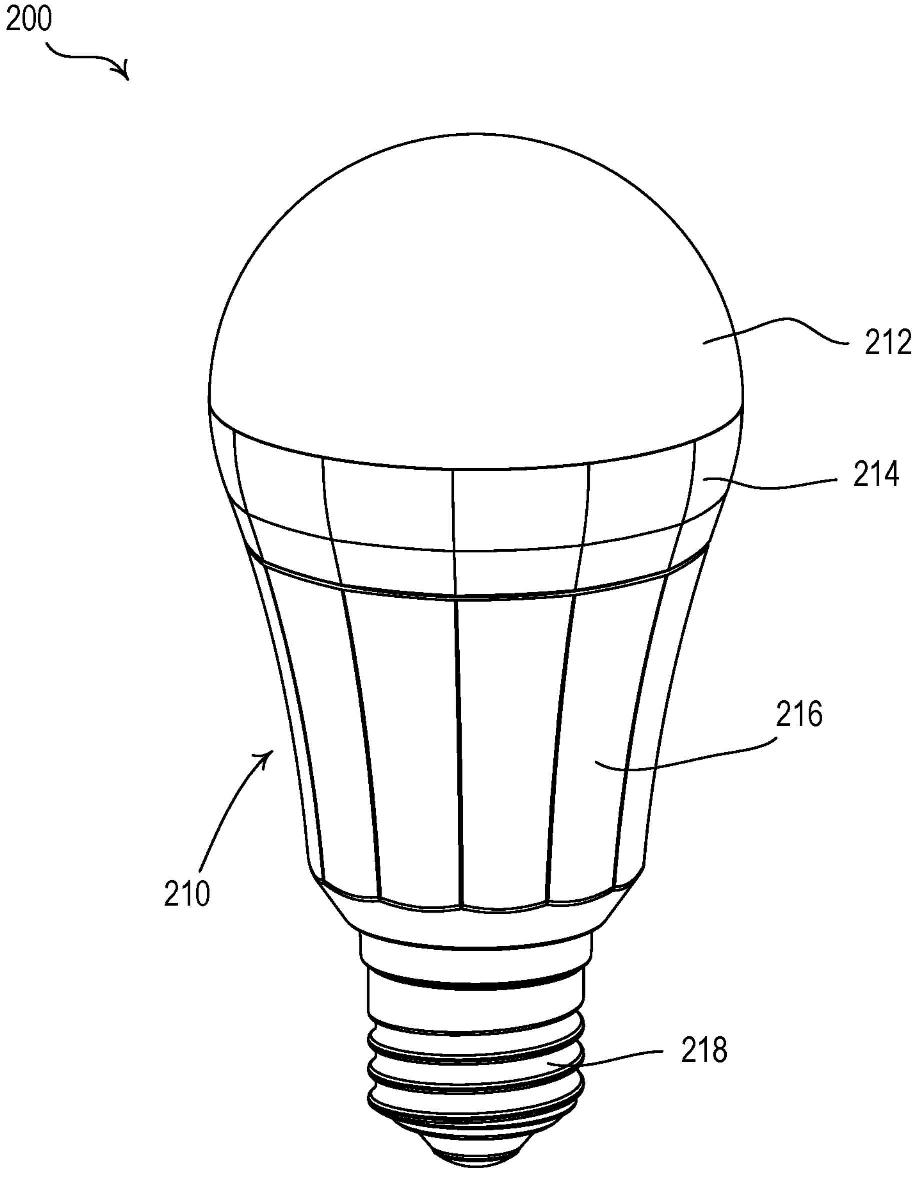
FIG. 2 is a simplified block diagram of an example smart lighting device that may be deployed in the lighting control system illustrated in FIG. 1A or FIG. 1B.

FIG. 2 is a perspective view of an example illumination device, such as a lighting device 200 (e.g., a controllable LED lighting device). The lighting device 200 may be an example of a smart light bulb, such as the smart bulb 120*a*, 120*b* of the lighting control system 100 of FIG. 1A. The lighting device 200 may include a housing 210 having an upper dome 212 (e.g., a lens), a lower dome 214, and a housing heat sink 216. The upper dome 212 may be transparent or translucent and may be flat or domed, for example. For example, the lamp may comprise an A-type lamp. The lighting device 200 may be installed in a lighting fixture (e.g., such as a downlight fixture and/or a table or floor lamp), and may be replaceable and/or removeable. The lighting device 200 may also have the form factor of other replaceable and/or removeable lamp, such as a parabolic aluminized reflector (PAR) lamp.

The lighting device 200 may include a base 218 (e.g., a screw-in base) that may be configured to be connected to (e.g., screwed into) a socket (e.g., a standard Edison socket) for electrically coupling the lighting device 200 to a power source, e.g., an alternating-current (AC) power source. The lighting device 200 may also have another type of base, such as a pin base, a twist-and-lock base, a bayonet base, or other suitable type of base. The lighting device 200 may have a different form factor, such as a linear form factor or other shape and/or size. The lighting device 200 may also be installed (e.g., permanently installed) in a lighting fixture, such as a downlight fixture, a linear lighting fixture, a strip lighting fixture, or other lighting fixture having one or more integral lighting devices (e.g., light engines).

Figure 3:
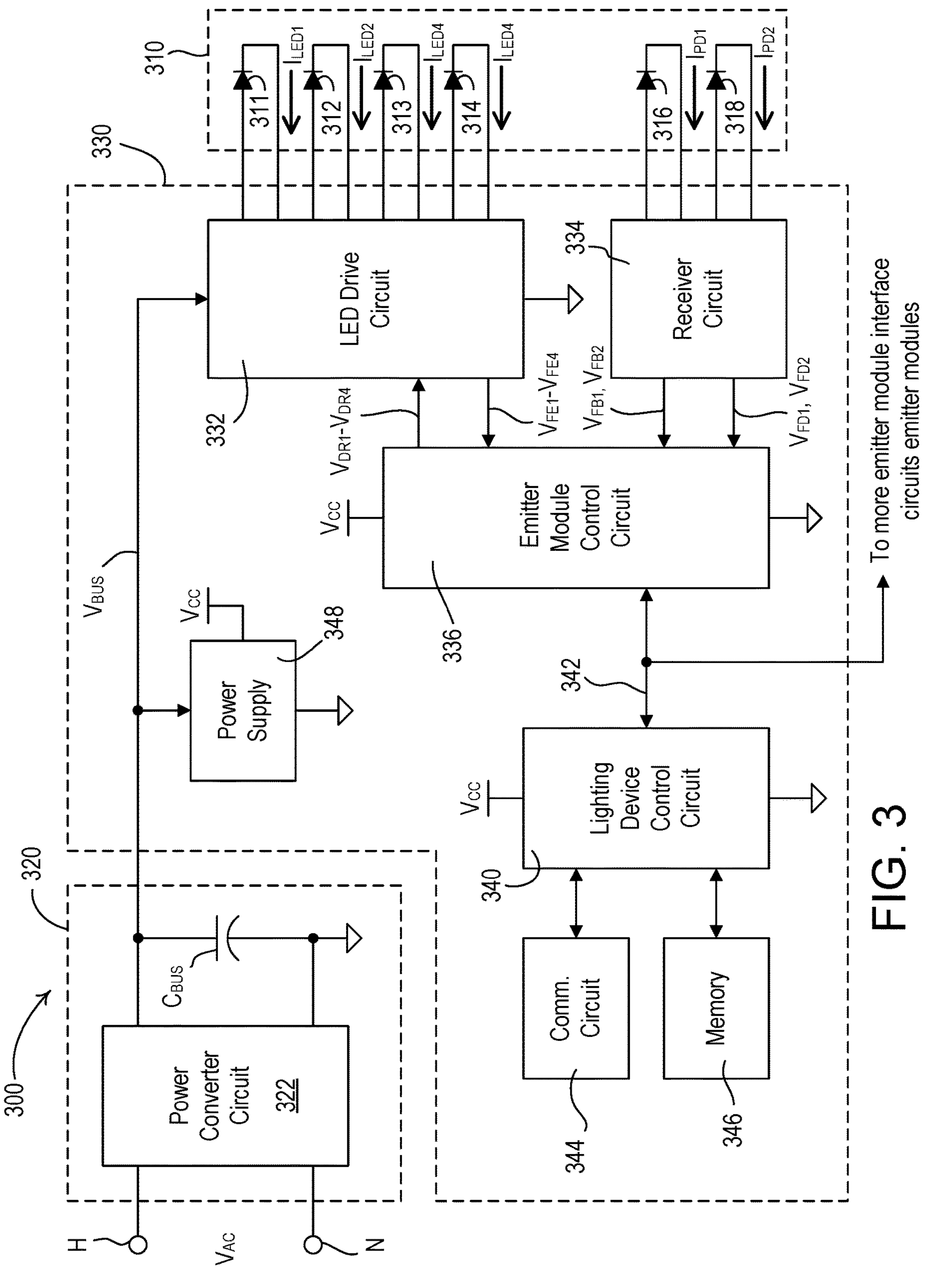
FIG. 3 is a simplified block diagram of an example controllable lighting device that may be deployed in the lighting control system illustrated in FIG. 1A or FIG. 1B.

FIG. 3 is a simplified block diagram of an example controllable lighting device 300 for use in a lighting control system (e.g., the lighting control system 100 of FIG. 1A or the lighting control system 100*b* of FIG. 1B). FIG. 3 is a simplified block diagram of an example lighting device 300 for use in a lighting control system (e.g., the lighting device 100 shown in FIG. 1A or the lighting fixture 110*a*-110*d* shown in FIG. 1B). The lighting device 300 may be an example of a smart bulb, such as the smart bulbs 120*a*, 120*b* shown in FIG. 1A, a smart lighting device, such as the LED driver 130 of FIG. 1A, the lighting fixture 110*a*-110*d* shown in FIG. 1B, the lighting device 200 shown in FIG. 2, and/or the like. The controllable lighting device 300 may include all or a subset of the components illustrated in FIG. 3.

The lighting device 300 may include one or more emitter modules 310. For example, if the lighting device 300 is a PAR lamp (e.g., as shown in FIGS. 1 and 2), the lighting device 300 may include a single emitter module 310. The emitter module 310 may include one or more emitters 311, 312, 313, 314. Each of the emitters 311, 312, 313, 314 is shown in FIG. 3 as a single LED, but may each include a plurality of LEDs connected in series (e.g., a chain of LEDs), a plurality of LEDs connected in parallel, or a suitable combination thereof, depending on the particular lighting system. In addition, each of the emitters 311, 312, 313, 314 may include one or more organic light-emitting diodes (OLEDs). For example, the first emitter 311 may represent a chain of red LEDs, the second emitter 312 may represent a chain of blue LEDs, the third emitter 313 may represent a chain of green LEDs, and the fourth emitter 314 may represent a chain of white or amber LEDs. The emitters 311, 312, 313, 314 may be controlled to adjust an intensity level (e.g., lighting intensity level or brightness) and/or a color (e.g., a color temperature) of a cumulative light output of the lighting device 300. The emitter module 310 may also include one or more detectors 316, 318 (e.g., photodiodes, such as a red LED and a green LED) that may produce respective photodiode currents $I_{PD1}$, $I_{PD2}$ (e.g., detector signals) in response to incident light.

The lighting device 300 may include a power converter circuit 320, which may receive a source voltage, such as an AC mains line voltage $V_{AC}$, via a hot connection H and a neutral connection N, and generate a DC bus voltage $V_{BUS}$ (e.g., approximately 15-20V) across a bus capacitor $C_{BUS}$. The power converter circuit 320 may include, for example, a boost converter, a buck converter, a buck-boost converter, a flyback converter, a single-ended primary-inductance converter (SEPIC), a Ćuk converter, or any other suitable power converter circuit for generating an appropriate bus voltage. The power converter circuit 320 may provide electrical isolation between the AC power source and the emitters 311, 312, 313, 314, and may operate as a power factor correction (PFC) circuit to adjust the power factor of the lighting device 300 towards a power factor of one.

The lighting device 300 may include one or more emitter module interface circuits 330 (e.g., one emitter module interface circuit per emitter module 310 in the lighting device 300). The emitter module interface circuit 330 may include a load control circuit (e.g., such as an LED drive circuit 332) for controlling (e.g., individually controlling) the power delivered to and an intensity (e.g., lighting intensity level and/or luminous flux) of the light emitted of each of the emitters 311, 312, 313, 314 of the respective emitter module 310. The LED drive circuit 332 may receive the bus voltage $V_{BUS}$ and may adjust magnitudes of respective LED drive currents $I_{LED1}$, $I_{LED2}$, $I_{LED3}$, $I_{LED4}$ conducted through the emitters 311, 312, 313, 314. The LED drive circuit 332 may include one or more regulation circuits (e.g., four regulation circuits), such as switching regulators (e.g., buck converters) for controlling the magnitudes of the respective LED drive currents $I_{LED1}$-$I_{LED4}$. An example of the LED drive circuit 332 is described in greater detail in U.S. Pat. No. 9,485,813, issued Nov. 1, 2016, entitled ILLUMINATION DEVICE AND METHOD FOR AVOIDING AN OVER-POWER OR OVER-CURRENT CONDITION IN A POWER CONVERTER, the entire disclosure of which is hereby incorporated by reference.

The emitter module interface circuit 330 may also include a receiver circuit 334 that may be electrically coupled to the detectors 316, 318 of the emitter module 310 for generating respective optical feedback signals $V_{FB1}$, $V_{FB2}$ in response to the photodiode currents $I_{PD1}$, $I_{PD2}$. The receiver circuit 334 may include one or more trans-impedance amplifiers (e.g., two trans-impedance amplifiers) for converting the respective photodiode currents $I_{PD1}$, $I_{PD2}$ into the optical feedback signals $V_{FB1}$, $V_{FB2}$. For example, the optical feedback signals $V_{FB1}$, $V_{FB2}$ may have DC magnitudes that indicate the magnitudes of the respective photodiode currents $I_{PD1}$, $I_{PD2}$.

The emitter module interface circuit 330 may also include an emitter module control circuit 336 for controlling the LED drive circuit 332 to control the intensity levels of the emitters 311, 312, 313, 314 of the emitter module 310. The emitter module control circuit 336 may include, for example, a microprocessor, a microcontroller, a programmable logic device (PLD), an application specific integrated circuit (ASIC), a field-programmable gate array (FPGA), or any other suitable processing device or controller. The emitter module control circuit 336 may generate one or more drive signals $V_{DR1}$, $V_{DR2}$, $V_{DR3}$, $V_{DR4}$ for controlling the respective regulation circuits in the LED drive circuit 332. The emitter module control circuit 336 may receive the optical feedback signals $V_{FB1}$, $V_{FB2}$ from the receiver circuit 334 for determining a luminous flux LE of the light emitted by the emitters 311, 312, 313, 314.

The emitter module control circuit 336 may also receive a plurality of emitter forward-voltage feedback signals $V_{FE1}$, $V_{FE2}$, $V_{FE3}$, $V_{FE4}$ from the LED drive circuit 332 and a plurality of detector forward-voltage feedback signals $V_{FD1}$, $V_{FD2}$ from the receiver circuit 334. The emitter forward-voltage feedback signals $V_{FE1}$-$V_{FE4}$ may be representative of the magnitudes of the forward voltages of the respective emitters 311, 312, 313, 314, which may indicate temperatures $T_{E1}$, $T_{E2}$, $T_{E3}$, $T_{E4}$ of the respective emitters. If each emitters 311, 312, 313, 314 includes multiple LEDs electrically coupled in series, the emitter forward-voltage feedback signals $V_{FE1}$-$V_{FE4}$ may be representative of the magnitude of the forward voltage across a single one of the LEDs or the cumulative forward voltage developed across multiple LEDs in the chain (e.g., all of the series-coupled LEDs in the chain). The detector forward-voltage feedback signals $V_{FD1}$, $V_{FD2}$ may be representative of the magnitudes of the forward voltages of the respective detectors 316, 318, which may indicate temperatures $T_{D1}$, $T_{D2}$ of the respective detectors. For example, the detector forward-voltage feedback signals $V_{FD1}$, $V_{FD2}$ may be equal to the forward voltages $V_{FD}$ of the respective detectors 316, 318.

The lighting device 300 may include a lighting device control circuit 340 that may be electrically coupled to the emitter module control circuit 336 of each of the one or more emitter module interface circuits 330 via a communication bus 342 (e.g., an $I^2C$ communication bus). The lighting device control circuit 340 may be configured to communicate with the emitter module control circuit 336 via the communication bus 343 to control the emitters 311, 312, 313, 314 to control the intensity level (e.g., lighting intensity level and/or brightness) and/or the color (e.g., the color temperature) of the cumulative light emitted by the lighting device 300. The lighting device control circuit 340 may include, for example, a microprocessor, a microcontroller, a programmable logic device (PLD), an application specific integrated circuit (ASIC), a field-programmable gate array (FPGA), or any other suitable processing device or controller. The lighting device control circuit 340 may be configured to adjust (e.g., dim) a present intensity $L_{PRES}$ (e.g., a present brightness) of the cumulative light emitted by the lighting device 300 towards a target intensity level $L_{TRGT}$ (e.g., a target brightness), which may range across a dimming range of the lighting device, e.g., between a low-end intensity $L_{LE}$ (e.g., a minimum intensity, such as approximately 0.1%-1.0%) and a high-end intensity $L_{HE}$ (e.g., a maximum intensity, such as approximately 100%). For example, the lighting device control circuit 340 may be configured to adjust the target intensity level $L_{TRGT}$ by transmitting an intensity value to the emitter module control circuit 336 via the communication bus 342.

The lighting device control circuit 340 may be configured to adjust a present color $C_{PRES}$ of the cumulative light emitted by the lighting device 300 towards a target color $C_{TRGT}$ (e.g., in an XY chromaticity space, where colors may be defined by an x-chromaticity coordinate and a y-chromaticity coordinate). The lighting device control circuit 340 may be configured to adjust a present color temperature $T_{PRES}$ of the cumulative light emitted by the lighting device 300 towards a target color temperature $T_{TRGT}$ (e.g., in a correlated color temperature (CCT) chromaticity space, where colors may be defined by a color temperature value). The CCT chromaticity space may range between warm-white color temperature (e.g., approximately 1400 K) and a cool-white color temperature (e.g., approximately 10,000 K). For example, the lighting device control circuit 340 may be configured to adjust the present color $C_{PRES}$ of the cumulative light emitted by the lighting device 300 by transmitting one or more color values to the emitter module control circuit 336. The color values may comprise, for example, a CCT value (e.g., in the CCT chromaticity space), an x-chromaticity coordinate value and a y-chromaticity coordinate value (e.g., in the XY chromaticity space), and/or one or more red-green-blue (RGB) values.

The lighting device 300 may include a communication circuit 344 coupled to the lighting device control circuit 340. The communication circuit 344 may include one or more wireless communication circuits, such as, for example, a radio-frequency (RF) transceiver coupled to an antenna for transmitting and/or receiving RF signals. The one or more wireless communication circuits may comprise an RF transmitter for transmitting RF signals, an RF receiver for receiving RF signals, or an infrared (IR) transmitter and/or receiver for transmitting and/or receiving IR signals. For example, the communication circuit 344 may comprise a first wireless communication circuit capable of communicating on a first wireless communication link (e.g., a wireless network communication link) using a first wireless protocol (e.g., a wireless network communication protocol, such as the CLEAR CONNECT (e.g., CLEAR CONNECT A and/or CLEAR CONNECT X) and/or THREAD protocols), and a second wireless communication circuit capable of communicating on a second wireless communication link (e.g., a short-range wireless communication link) using a second wireless protocol (e.g., a short-range wireless communication protocol, such as the BLUETOOTH and/or BLUETOOTH LOW ENERGY (BLE) protocols). The communication circuit 344 may be configured to receive RF signals (e.g., wireless control signals) from one or more remote control devices via the wireless network communication link. The wireless control signals may include messages that indicate a destination color (e.g., in the XY chromaticity space, the CCT chromaticity space, a UV color space, and/or the like). The communication circuit 344 may be configured to receive RF signals (e.g., wireless configuration signals) from a computing device (e.g., a computer, a cloud server, a mobile device, such as a smart phone and/or a tablet, etc.) via the short-range wireless communication link (e.g., for configuring the operation of the lighting device 300). In addition, the communication circuit 344 may be coupled to the hot connection H and the neutral connection N of the lighting device 300 for transmitting a control signal via the electrical wiring using, for example, a power-line carrier (PLC) communication technique.

The lighting device control circuit 340 may be configured to determine the target intensity $L_{TRGT}$, the target color $C_{TRGT}$, and/or the target color temperature $T_{TRGT}$ for the lighting device 300 in response to messages (e.g., digital messages) received via the communication circuit 334. When the lighting device control circuit 340 receives a target color temperature $T_{TRGT}$, the lighting device control circuit 340 may be configured to convert the target color temperature $T_{TRGT}$ from the CCT chromaticity space to a target color $C_{TRGT}$ in the XY chromaticity space (e.g., as defined by an x-chromaticity coordinate and a y-chromaticity coordinate). The lighting device control circuit 340 may transmit the x-chromaticity coordinate and a y-chromaticity coordinate defining the target color $C_{TRGT}$ to the emitter module control circuit 336.

The lighting device 300 may include a memory 346 configured to store operational characteristics of the lighting device 300 (e.g., the target intensity $L_{TRGT}$, the target color temperature $T_{TRGT}$, the low-end intensity $L_{LE}$, the high-end intensity $L_{HE}$, and/or any other combination of characteristics of the emitted light of the lighting device). The memory may be implemented as an external integrated circuit (IC) or as an internal circuit of the lighting device control circuit 340. The lighting device 300 may include a power supply 348 that may receive the bus voltage $V_{BUS}$ and generate a supply voltage $V_{CC}$ for powering the lighting device control circuit 340 and other low-voltage circuitry of the lighting device 300.

When the lighting device 300 is on, the lighting device control circuit 340 may be configured to control the emitter module(s) 310 to emit light substantially all of the time. The lighting device control circuit 340 may be configured to control the emitter module(s) 310 to disrupt the normal emission of light to measure one or more operational characteristics of the emitter modules during periodic measurement intervals. For example, during the measurement intervals, the emitter module control circuit 336 may be configured to individually turn on each of the different-colored emitters 311, 312, 313, 314 of the emitter module(s) 310 (e.g., while turning of the other emitters) and measure the luminous flux $L_E$ of the light emitted by that emitter using one of the two detectors 316, 318. For example, the emitter module control circuit 336 may turn on the first emitter 311 of the emitter module 310 (e.g., at the same time as turning off the other emitters 312, 313, 314) and determine the luminous flux $L_E$ of the light emitted by the first emitter 311 in response to the first optical feedback signal $V_{FB1}$ generated from the first detector 316. In addition, the emitter module control circuit 336 may be configured to drive the emitters 311, 312, 313, 314 and the detectors 316, 318 to generate the emitter forward-voltage feedback signals $V_{FE1}$-$V_{FE4}$ and the detector forward-voltage feedback signals $V_{FD1}$, $V_{FD2}$ during the measurement intervals.

Methods of measuring the operational characteristics of emitter modules in a lighting device are described in greater detail in U.S. Pat. No. 9,332,598, issued May 3, 2016, entitled INTERFERENCE-RESISTANT COMPENSATION FOR ILLUMINATION DEVICES HAVING MULTIPLE EMITTER MODULES; U.S. Pat. No. 9,392,660, issued Jul. 12, 2016, entitled LED ILLUMINATION DEVICE AND CALIBRATION METHOD FOR ACCURATELY CHARACTERIZING THE EMISSION LEDS AND PHOTODETECTOR(S) INCLUDED WITHIN THE LED ILLUMINATION DEVICE; and U.S. Pat. No. 9,392,663, issued Jul. 12, 2016, entitled ILLUMINATION DEVICE AND METHOD FOR CONTROLLING AN ILLUMINATION DEVICE OVER CHANGES IN DRIVE CURRENT AND TEMPERATURE, the entire disclosures of which are hereby incorporated by reference.

Calibration values for the various operational characteristics of the lighting device 300 may be stored in the memory 346 as part of a calibration procedure performed during manufacturing of the lighting device 300. Calibration values may be stored for each of the emitters 311, 312, 313, 314 and/or the detectors 316, 318 of each of the emitter modules 310. For example, calibration values may be stored for measured values of luminous flux (e.g., in lumens), x-chromaticity coordinate, y-chromaticity coordinate, emitter forward voltage, photodiode current, and detector forward voltage. For example, the luminous flux, x-chromaticity coordinate, and y-chromaticity coordinate measurements may be obtained from the emitters 311, 312, 313, 314 using an external calibration tool, such as a spectrophotometer. The values for the emitter forward voltages, photodiode currents, and detector forward voltages may be measured internally to the lighting device 300. The calibration values for each of the emitters 311, 312, 313, 314 and/or the detectors 316, 318 may be measured at a plurality of different drive currents, e.g., at 100%, 30%, and 10% of a maximum drive current for each respective emitter.

In addition, the calibration values for each of the emitters 311, 312, 313, 314 and/or the detectors 316, 318 may be measured at a plurality of different operating temperatures. The lighting device 300 may be operated in an environment that is controlled to multiple calibration temperatures and values of the operational characteristics may be measured and stored. For example, the lighting device 300 may be operated at a cold calibration temperature, such as room temperature (e.g., approximately 25° C.), and a hot calibration temperature (e.g., approximately 85° C.). At each temperature, the calibration values for each of the emitters 311, 312, 313, 314 and/or the detectors 316, 318 may be measured at each of the plurality of drive currents and stored in the memory 346.

After installation, the lighting device control circuit 340 of the lighting device 300 may use the calibration values stored in the memory 346 to maintain a constant light output from the emitter module(s) 310. The lighting device control circuit 340 may determine target values for the luminous flux $L_E$ to be emitted from the emitters 311, 312, 313, 314 to achieve the target intensity $L_{TRGT}$ and/or the target color temperature $T_{TRGT}$ for the lighting device 300. The lighting device control circuit 340 may determine the magnitudes for the respective drive currents $I_{LED1}$-$I_{LED4}$ for the emitters 311, 312, 313, 314 based on the determined target values for the luminous flux $L_E$ to be emitted from the emitters 311, 312, 313, 314. When the age of the lighting device 300 is zero, the magnitudes of the respective drive currents $I_{LED1}$-$I_{LED4}$ for the emitters 311, 312, 313, 314 may be controlled to initial magnitudes $I_{LED\text{-}INITIAL}$.

The light output of the emitter modules 310 may decrease as the emitters 311, 312, 313, 314 age. The lighting device control circuit 340 may be configured to increase the magnitudes of the drive current $I_{DR}$ for the emitters 311, 312, 313, 314 to adjusted magnitudes $I_{LED\text{-}ADJUSTED}$ to achieve the determined target values for the luminous flux $L_E$ of the target intensity $L_{TRGT}$ and/or the target color temperature $T_{TRGT}$. Methods of adjusting the drive currents of emitters to achieve a constant light output as the emitters age are described in greater detail in U.S. Pat. No. 9,769,899, issued Sep. 19, 2017, entitled ILLUMINATION DEVICE AND AGE COMPENSATION METHOD, the entire disclosure of which is hereby incorporated by reference.

Figure 4:
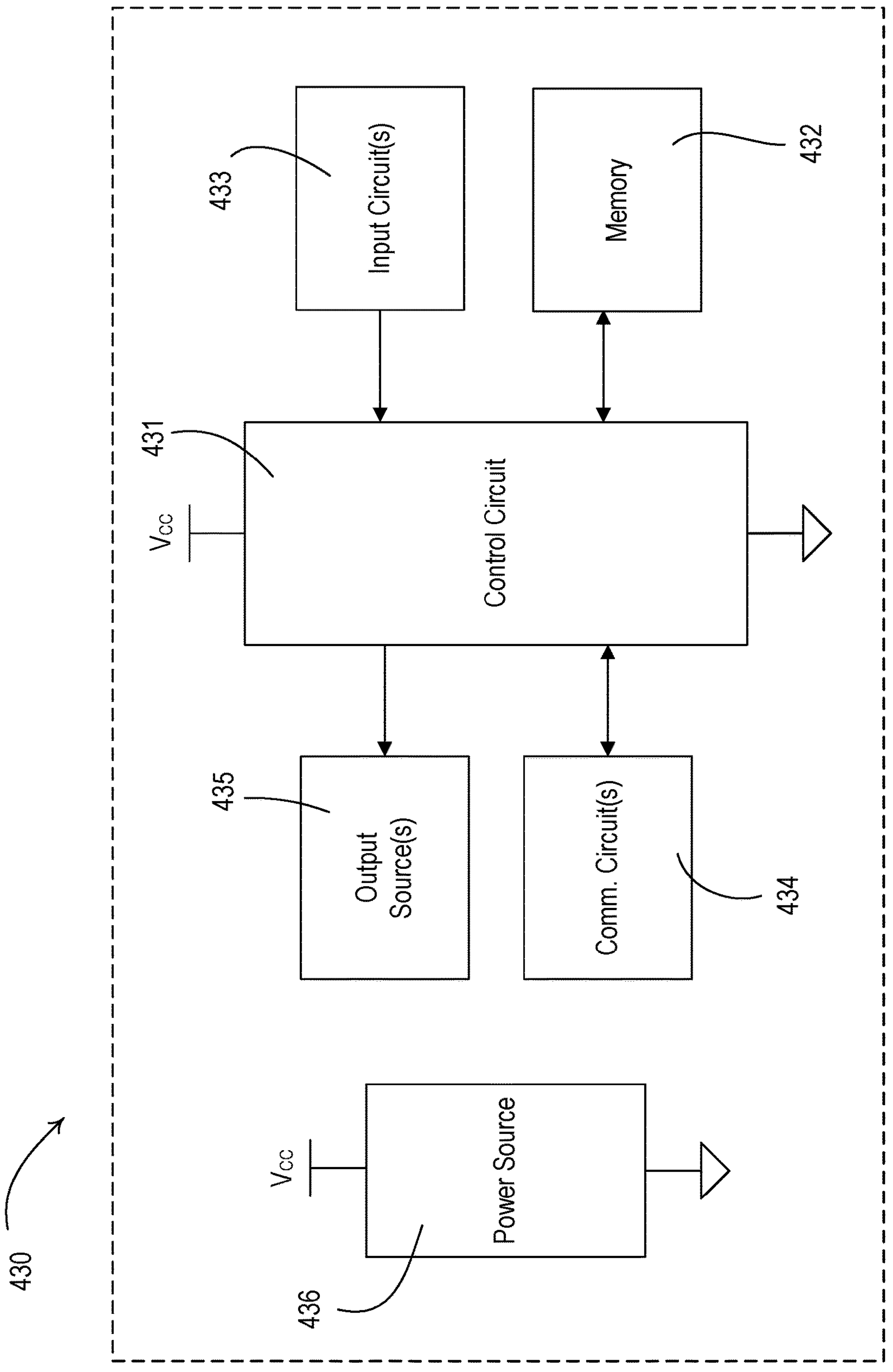
FIG. 4 is a simplified block diagram of an example computing device that may be deployed in the lighting control system illustrated in FIG. 1A or FIG. 1B.

FIG. 4 is a simplified block diagram of an example of a device 430 capable of processing and/or communication in a load control system, such as the lighting control system 100 of FIG. 1A or the lighting control system 100*b* of FIG. 1B. The device 430 may be an example of a computing device 160 (e.g., a smart phone, a laptop, and/or a tablet device), a remote-control device of the lighting control system (e.g., when the dimmer 140 is configured as a remote-control device), and/or a system controller of the lighting control system (e.g., the system controller 150 or the system controller 140*b*). The device 430 may be a control device capable of transmitting or receiving messages.

The device 430 may include a control circuit 431 for controlling the functionality of the device 430. The control circuit 431 may include one or more general purpose processors, special purpose processors, conventional processors, digital signal processors (DSPs), microprocessors, integrated circuits, a programmable logic device (PLD), application specific integrated circuits (ASICs), or the like. The control circuit 431 may perform signal coding, data processing, image processing, power control, input/output processing, or any other functionality that enables the device 431 to perform as one of the devices of the load control system (e.g., load control system 100) described herein.

The control circuit 431 may be communicatively coupled to a memory 432 to store information in and/or retrieve information from the memory 432. The memory 432 may comprise a computer-readable storage media or machine-readable storage media that maintains a device dataset of associated device identifiers, network information, and/or computer-executable instructions for performing as described herein. For example, the memory 432 may comprise computer-executable instructions or machine-readable instructions that include one or more portions of the procedures described herein. The control circuit 431 may access the instructions from memory 432 for being executed to cause the control circuit 431 to operate as described herein, or to operate one or more other devices as described herein. The memory 432 may comprise computer-executable instructions for executing configuration software. For example, the computer-executable instructions may be executed to display a GUI for copying and pasting one or more settings as described herein. The computer-executable instructions may be executed to perform procedures as described herein. Further, the memory 432 may have stored thereon one or more settings and/or control parameters associated with the device 430.

The memory 432 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 432 may be implemented as an external integrated circuit (IC) or as an internal circuit of the control circuit 431.

The device 430 may include one or more communication circuits 434 that are in communication with the control circuit 431 for sending and/or receiving information as described herein. The communication circuit 434 may perform wireless and/or wired communications. The communication circuit 434 may be a wired communication circuit capable of communicating on a wired communication link. The wired communication link may include an Ethernet communication link, an RS-485 serial communication link, a 0-10 volt analog link, a pulse-width modulated (PWM) control link, a Digital Addressable Lighting Interface (DALI) digital communication link, and/or another wired communication link. The communication circuit 134 may be configured to communicate via power lines (e.g., the power lines from which the device 130 receives power) using a power line carrier (PLC) communication technique. The communication circuit 434 may be a wireless communication circuit including one or more RF or infrared (IR) transmitters, receivers, transceivers, and/or other communication circuits capable of performing wireless communications.

Though a single communication circuit 434 may be illustrated, multiple communication circuits may be implemented in the device 430. The device 430 may include a communication circuit configured to communicate via one or more wired and/or wireless communication networks and/or protocols and at least one other communication circuit configured to communicate via one or more other wired and/or wireless communication networks and/or protocols. For example, a first communication circuit may be configured to communicate via a wired or wireless communication link, while another communication circuit may be capable of communicating on another wired or wireless communication link. The first communication circuit may be configured to communicate via a first wireless communication link (e.g., a wireless network communication link) using a first wireless protocol (e.g., a wireless network communication protocol, and the second communication circuit may be configured to communicate via a second wireless communication link (e.g., a short-range or direct wireless communication link) using a second wireless protocol (e.g., a short-range wireless communication protocol).

The control circuit 431 may be in communication with one or more input circuits 433 from which inputs may be received. The input circuits 433 may be included in a user interface for receiving inputs from the user. For example, the input circuits 433 may include an actuator (e.g., a momentary switch that may be actuated by one or more physical buttons) that may be actuated by a user to communicate user input or selections to the control circuit 431. The control circuit may be configured to perform control by transmitting control instructions indicating the actuation on the user interface and/or the control instructions generated in response to the actuation. The actuator may include a touch sensitive surface, such as a capacitive touch surface, a resistive touch surface an inductive touch surface, a surface acoustic wave (SAW) touch surface, an infrared touch surface, an acoustic pulse touch surface, or another touch sensitive surface that is configured to receive inputs (e.g., touch actuations/inputs), such as point actuations or gestures from a user. The control circuit 431 of the device 430 may transmit control instructions (e.g., data relating to a customized dimming curve) in response to an actuation or input from the user on the touch sensitive surface.

The input circuits 433 may include a sensing circuit (e.g., a sensor). The sensing circuit may be an occupant sensing circuit, a temperature sensing circuit, a color (e.g., color temperature) sensing circuit, a visible light sensing circuit (e.g., a camera), a daylight sensing circuit or ambient light sensing circuit, or another sensing circuit for receiving input (e.g., sensing an environmental characteristic in the environment of the device 430). The control circuit 431 may receive information from the one or more input circuits 433 and process the information for performing functions as described herein.

The control circuit 431 may be in communication with one or more output sources 435. The output sources 435 may include one or more indicators (e.g., visible indicators, such as LEDs) for providing indications (e.g., feedback) to a user. The output sources 435 may include a display (e.g., a visible display) for providing information (e.g., feedback) to a user. The control circuit 431 and/or the display may generate a graphical user interface (GUI) generated via software for being displayed on the device 430 (e.g., on the display of the device 430).

The user interface of the device 430 may combine features of the input circuits 433 and the output sources 435. For example, the user interface may have buttons that actuate the actuators of the input circuits 433 and may have indicators (e.g., visible indicators) that may be illuminated by the light sources of the output sources 435. In another example, the display and the control circuit 431 may be in two-way communication, as the display may display information to the user and include a touch screen capable of receiving information from a user. The information received via the touch screen may be capable of providing the indicated information received from the touch screen as information to the control circuit 431 for performing functions or control.

Each of the hardware circuits within the device 430 may be powered by a power source 436. The power source 436 may include a power supply configured to receive power from an alternating-current (AC) power supply or direct-current (DC) power supply, for example. In addition, the power source 436 may comprise one or more batteries. The power source 436 may produce a supply voltage $V_{CC}$ for powering the hardware within the device 430.

As described herein, the lighting devices (e.g., the smart bulbs 120*a*, 120*b*, and/or the LED driver 130) may be configured to control the color temperature (e.g., the correlated color temperature (CCT)) of the cumulative light emitted by the lighting device to be equal to a target color temperature $T_{TRGT}$. The lighting device (e.g., a control circuit of the lighting device) may determine how to mix the light emitted by a plurality of (e.g., two) emitter circuits (e.g., LEDs) of the lighting device to cause the color temperature of the cumulative light emitted by the lighting device to be equal to the target color temperature $T_{TRGT}$. For example, the lighting device may control the magnitudes of respective drive currents conducted through the emitter circuits to specific magnitudes based on, for example, the target color temperature $T_{TRGT}$, the target intensity level $L_{TRGT}$, and/or the specific color temperature of each emitter circuit. For example, the lighting device may determine the magnitude of the drive currents based on the lumen values needed from each emitter circuit to generate the target color temperature $T_{TRGT}$. The lighting device may use a table (e.g., stored in memory) and/or one or more equations to determine the lumen values and/or the magnitude of the drive currents necessary to cause the color temperature of the cumulative light emitted by the lighting device to be equal to the target color temperature $T_{TRGT}$. Alternatively, the system may send, to the lighting device, the lumen values and/or the magnitude of the drive currents necessary to cause the color temperature of the cumulative light emitted by the lighting device to be equal to the target color temperature $T_{TRGT}$.

Further, the lighting device may be configured to adjust the color temperature of the light emitted by the lighting device as a function of intensity level. For instance, the lighting device may be configured to control a present intensity level $L_{PRES}$ of the light emitted by the lighting device towards a target intensity level $L_{TRGT}$, which may range across a dimming range, e.g., between a low-end intensity $L_{LE}$ (e.g., a minimum intensity, such as approximately 0.1%-1.0%) and a high-end intensity $L_{HE}$ (e.g., a maximum intensity, such as approximately 100%), and may be configured to adjust a present color temperature $T_{PRES}$ of the cumulative light emitted by the lighting device towards a target color temperature $T_{TRGT}$, which may range between a cool-white color temperature $T_{CW}$ (e.g., approximately 3100-6500 K) and a warm-white color temperature $T_{WW}$ (e.g., approximately 1500-3000 K).

Further, in some examples, the lighting device may be configured to control the target color temperature $T_{TRGT}$ as a function of the target intensity level $L_{TRGT}$ according to a dimming curve. In some instances, when configured with certain dimming curves, the lighting device may increase the target color temperature $T_{TRGT}$ as the target intensity level $L_{TRGT}$ is increased, and decrease the target color temperature $T_{TRGT}$ as the target intensity level $L_{TRGT}$ is decreased. Accordingly, the lighting device may control a plurality of emitter circuits to control the light emitted by the lighting device along an intensity range that is associated with the color temperatures (CCT values) between the emitter circuits, for example, to provide warm dimming, or vice versa (e.g., cool dimming, as described herein).

Figure 5A:
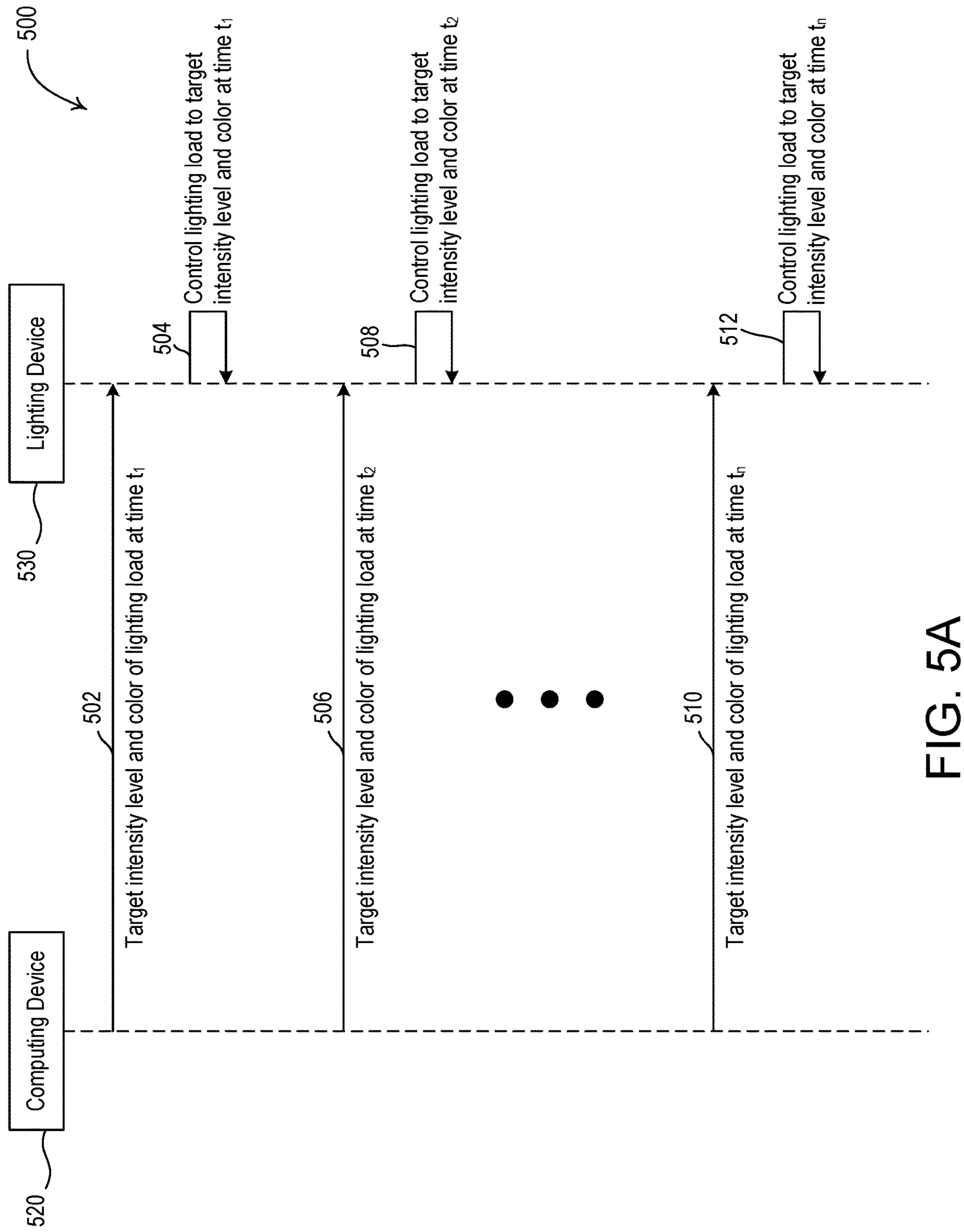
FIG. 5A is an example sequence diagram that illustrates a manner of controlling a lighting device.

FIG. 5A is a sequence diagram that illustrates a procedure 500 of controlling a lighting device. In the procedure 500, a computing device 520 may be configured to transmit multiple, discrete instructions to a lighting device 530. The lighting device 530, in response to receiving each discrete instruction, may control a drive circuit to cause one or more emitters to emit light at a target intensity level and/or a target color as defined by the discrete instructions. Accordingly, the procedure 500 requires that the computing device 520 continuously send (e.g., stream) commands for adjusting the target intensity level and/or target color to the lighting device 530 to cause the lighting device 530 to emit light that changes intensity level and/or color over a time period.

For instance, at 502 in the procedure 500, the computing device 520 may transmit a first message that includes a command for controlling the lighting device 530 to a target intensity level and/or a target color to the lighting device 530 at a time $t_1$. In response, the lighting device 530 may receive the first message that indicates the target intensity level and color for the time $t_1$, and at 504, the lighting device 530 may control the drive circuit to cause one or more emitters of the lighting device 530 to emit light at the target intensity level and target color indicated by the first message at the time $t_1$. In the procedure 500, the lighting device 530 may temporarily store the target intensity level and target color indicated by the message(s) in memory (e.g., while the lighting device 530 is controlling the drive circuit according to the target intensity level and target color indicated by the message). In some examples, the lighting device 530 does not need to store the target intensity level and target color indicated by the message(s) over the long-term (e.g., permanently), for example, since the message(s) only include a subset of the data needed to respond to the command.

At 506, the computing device 520 may transmit a second message (e.g., that includes a command) that indicates a target intensity level and color to the lighting device 530 at a time $t_2$. In response, the lighting device 530 may receive the second message that that indicates the target intensity level and color for the time $t_2$, and at 508, the lighting device 530 may control the drive circuit to cause one or more emitters of the lighting device 530 to emit light at the target intensity level and target color indicated by the second message at the time $t_2$. The lighting device 530 may then receive (e.g., stream) multiple messages (e.g., a stream of multiple messages) from the computing device 520 to continuously change the target intensity level and/or the target color the light emitted by the lighting device 530 until, for example, the lighting device 530 is no longer instructed to change the target intensity level and/or the target color of the emitted light.

For instance, at 510, the computing device 520 may transmit a final message (e.g., that includes a command) that indicates a target intensity level and target color to the lighting device 530 at a time $t_n$. In response, the lighting device 530 may receive the final message that that indicates the target intensity level and the target color for the time $t_n$, and at 512, the lighting device 530 may control the drive circuit to cause one or more emitters of the lighting device 530 to emit light at the target intensity level and the target color indicated by the final message at the time $t_n$. Accordingly, using the procedure 500, the computing device 520 may instruct the lighting device 530 to adjust the target intensity level and/or the target color of the light emitted by the lighting device 530, but to do so, the lighting device 530 must receive (e.g., stream) a plurality of distinct messages from the computing device 520. Such a system requires heavy communication bandwidth, and in many instances, a dedicated communication channel (e.g., a Digital Multiplex (DMX) communication bus). Further, the constant communication in such systems can cause delay and/or errors in coordination of light emitted from a plurality of different lighting devices.

Figure 5B:
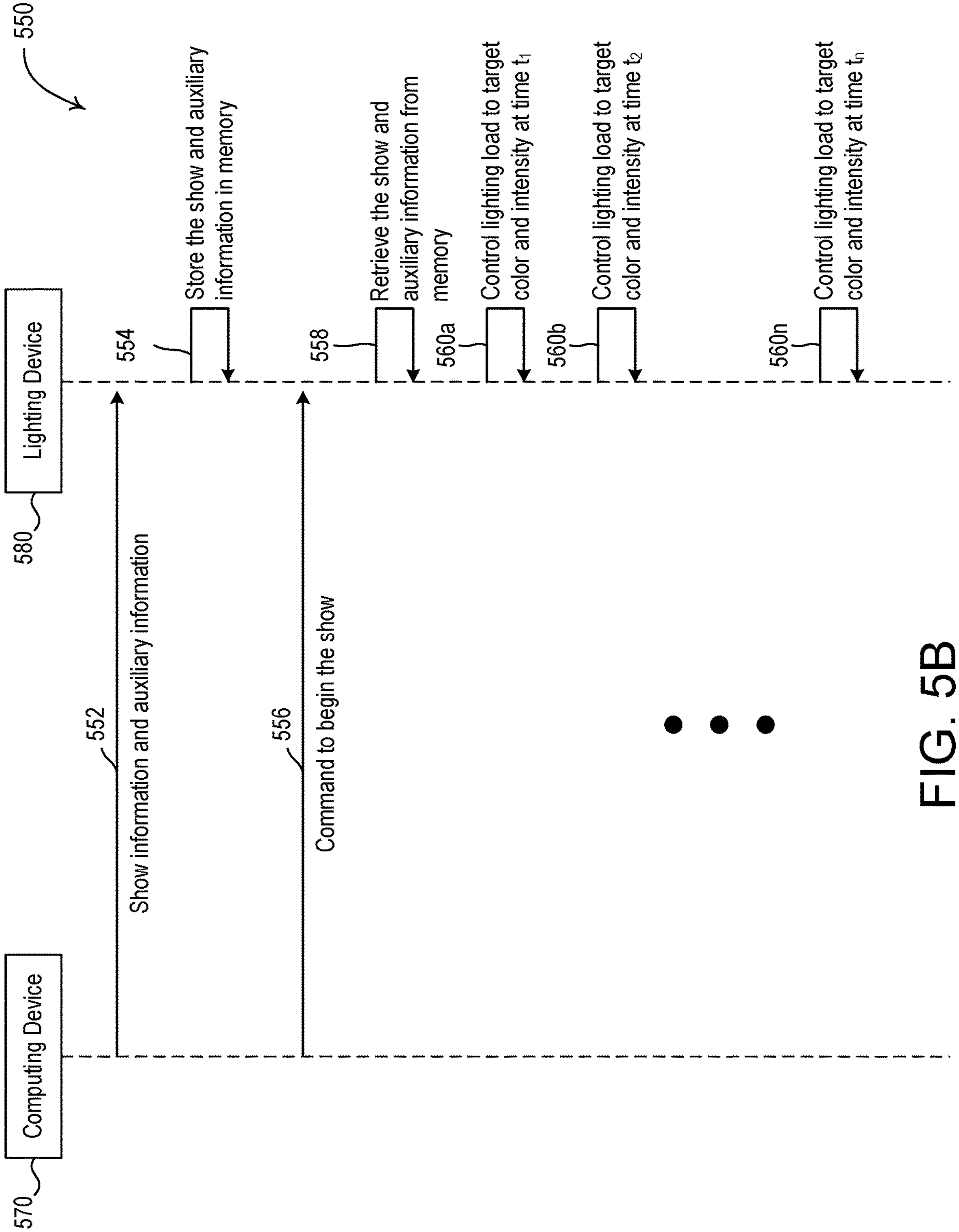
FIG. 5B is an example sequence diagram that illustrates another manner of controlling a lighting device.

FIG. 5B is a sequence diagram that illustrates a procedure 550 of controlling a lighting device. The procedure 550 may be performed by a computing device 570 and/or a lighting device 580. The computing device 570 may be an example of the computing device 160 of FIG. 1A, the computing device 150*b* of FIG. 1B, and/or the device 430 of FIG. 4. The lighting device 580 may be an example of the lighting device 100 shown in FIG. 1A, the lighting fixture 110*a*-110*d* of FIG. 1B, and/or the lighting device 300 shown in FIG. 3.

The computing device 570 and/or the lighting device 580 may perform the procedure 550 to configure the lighting device 580 to emit light according to a show, for instance, with one or more additional lighting devices. Using the procedure 550, the lighting device 580 may be configured to receive and store show information and/or auxiliary information that, for example, may be used to enable a plurality of lighting devices to put on a coordinated show. The show information may define predefined illumination content that is stored in memory of the lighting device prior to the reception of the command to execute the show. For example, the predefined illumination content may include illumination instructions (e.g., show information and auxiliary information) that causes the plurality of lighting devices to emit light that mimics a cycling rainbow, mimics candlelight flickers, mimics sunlight shining through a forest canopy, mimics a beathing pattern (e.g., yoga/meditation/workout), or mimics a weather event (e.g., clouds moving, lightning striking, aurora borealis, night sky, etc.).

At 552, the lighting device 580 may receive show information and auxiliary information from the computing device 570. At 554, the lighting device 580 may store the show information and auxiliary information in memory of the lighting device 580 (e.g., non-volatile and/or long-term memory). The show information may be defined by one or more tracks (e.g., default tracks). A track may define a relationship of a characteristic (e.g., a single characteristic) of the light emitted from the one or more emitters (e.g., an intensity value and/or one or more color values, such as a CCT value, XY chromaticity coordinate values, and/or RGB values, etc.) over time. For example, the show information may define a first track that defines an intensity level over time $L_{SHOW}(t)$ for the show. In addition, the show information may define one or more other tracks that define the color (e.g., CCT value, XY chromaticity coordinate values, and/or RGB values) over time. For example, the one or more other tracks that define the color over time may comprise a CCT value over time $T_{SHOW}(t)$. In addition, the one or more other tracks that define the color over time may comprise an x-chromaticity coordinate value over time $X_{SHOW}(t)$ and a y-chromaticity coordinate value over time $Y_{SHOW}(t)$. Further, the one or more other tracks that define the color over time may comprise a red value over time $R_{SHOW}(t)$, a green value over time $G_{SHOW}(t)$, and a blue value over time $B_{SHOW}(t)$. Accordingly, the show information may define a relationship of one or more characteristics of emitted light (e.g., intensity value, CCT value, XY chromaticity coordinate values, RGB values, etc.) with respect to time over a time duration $T_{SHOW}$ for the show.

In some examples, the tracks defined by the show information may be generated using one or more functions. One example of a function that may be used to generate the tracks is a spline function, such as a basis spline function (e.g., a B-spline function). Each function (e.g., splines) may define a relationship of a characteristic of emitted light with respect to time over the time duration $T_{SHOW}$ for the show. For instance, the show information may include a plurality of splines, and the lighting device may be configured to generate a default show based on the one or more splines. For example, the spline function may be a piecewise polynomial function defined by a number of breakpoints (e.g., knots) when the pieces of the function connect. For instance, the show information may include a plurality of breakpoints for the spline function for each track defined by the show information, and the lighting device may be configured to generate the default tracks (e.g., $L_{SHOW}(t)$, $T_{SHOW}(t)$, $[X_{SHOW}(t), Y_{SHOW}(t)]$, $[R_{SHOW}(t), G_{SHOW}(t), B_{SHOW}(t)]$, etc.) based on the breakpoints and using the spline function. For example, when the show includes a plurality of lighting devices, the show information transmitted to each of the lighting devices may be identical, such that the lighting devices are able to generate the same default tracks for the show.

The auxiliary information may be specific for the lighting device 580. For example, different auxiliary information may be provided to at least one other lighting device that is also configured with the show (e.g., to emit light according to the show information). The auxiliary information may include a time duration $T_{SHOW}$, a time offset value $t_{OFF}$, a frequency adjustment value, and/or an intensity adjustment value associated with the show. The time duration $T_{SHOW}$ may indicate the length in time of each of the tracks of the counterpart shows. The time offset value $t_{OFF}$ may indicate a time delay that the lighting device 580 is to apply to start of the show relative to the receipt of a command to execute the show. For instance, the lighting device 580 may be configured, via the time offset value $t_{OFF}$, to start the show at a different time than one or more other lighting devices that are also configured to execute the show in response to the command (e.g., the same command). For example, the intensity track of a counterpart show may define an intensity level over time $L_{CP}(t)$, where $L_{CP}(t)=L_{SHOW}(t+t_{OFF})$. The frequency adjustment value may indicate whether the lighting device is to repeat the show and/or how quickly the lighting device is to repeat the show. In some examples, the frequency adjustment value may be a frequency adjustment scalar $\alpha_{FREQ}$, such that the intensity track of a counterpart show may define an intensity level over time $L_{CP}(t)$, where $L_{CP}(t)=L_{SHOW}([\alpha_{FREQ}\cdot f_{INIT}]\cdot t)$ and $f_{INIT}$ is an initial frequency of the show.

The intensity adjustment value may indicate a change in the intensity level over time $L_{CP}(t)$ of the intensity track of the counterpart show (e.g., as compared to the default track defined by the show information) that the lighting device 580 is to apply when controlling the intensity level of the light emitted from the one or more emitters over the time duration $T_{SHOW}$ for the show. For example, the show information may indicate the default track, and the lighting device 580 may be configured to generate the intensity track of the counterpart show based on the intensity adjustment value, for instance, so that the intensity level of the lighting device 580 is different than the intensity level of the light emitted by one or more other lighting devices that are also configured to execute the show. For example, the intensity adjustment value may be an intensity adjustment offset $L_{OFF}$, which may be added to the intensity levels over time $L_{SHOW}(t)$ indicated by the default show to generate the intensity level over time $L_{CP}(t)$ of the intensity track of the counterpart show, e.g., $L_{CP}(t)=L_{SHOW}(t)+L_{OFF}$. For example, the intensity adjustment value may be an intensity adjustment scalar $L_{SC}$, which may be multiplied by the intensity levels over time $L_{SHOW}(t)$ indicated by the default show to generate the intensity level over time $L_{CP}(t)$ of the intensity track of the counterpart show, e.g., $L_{CP}(t)=L_{SC}\cdot L_{SHOW}(t)$.

At 556, the lighting device 580 may receive a command to execute the show from the computing device 570 (e.g., or other device within the system). For instance, the lighting device 580 may receive the command directly or indirectly from the computing device 570 and/or receive the command from another device, such as a dimmer switch and/or a remote control device. In some instances, the lighting device 580 may receive the show information, the auxiliary information, and/or the command over a wireless communication channel. In some examples, at 556, the lighting device 580 may control the drive circuit for controlling the intensity level and the color of the light emitted from the one or more emitters to generate the show, where the intensity level and the color of the light emitted from the one or more emitters is a function of the show information and the auxiliary information stored in the memory at 554. As such, the lighting device 580 may control, in response to the command and based on the show information and the auxiliary information stored in the memory, the drive circuit for controlling the intensity level and the color of the light emitted from the one or more emitters over the time duration $T_{SHOW}$ defined by the auxiliary information, for example, based on the reception of a command (e.g., a single command) to execute the show. Accordingly, using the procedure 550, the lighting device 580 may execute the show without having to stream discrete instructions from one or more external computing devices (e.g., such as what is required by the procedure 500).

At 558, the lighting device 580 may retrieve the show information and/or the auxiliary information from memory (e.g., non-volatile and/or long-term memory) of the lighting device 580. At 560*a*, the lighting device 580 may be configured to control one or more emitters to emit light at the target intensity level and/or target color defined by the show information and/or the auxiliary information at time $t_1$. Accordingly, the lighting device 580 may start the show at time $t_1$ (e.g., start the counterpart show of the lighting device 580).

The start time of the show is relative to a time that the command to execute the show is received at the lighting device 580. As such, the start time of the show may be relative to a time that the command to execute the show is received by the lighting device 580. Further, in some examples, the lighting device 580 may be configured to be coupled to an alternating-current (AC) power source for receiving an AC mains line voltage. In such examples, the control circuit may be configured to execute the show in response to the reception of the command to execute the show and based on one or more zero-crossings of the AC main line voltage. For instance, the zero-crossings of the AC main line voltage may be used as a common timing mechanism so that a plurality of different lighting devices may coordinate the start of the show.

At 560*b*, the lighting device 580 may be configured to control one or more emitters to emit light at the target intensity level and/or target color defined by the show information and/or the auxiliary information stored in memory at time $t_2$. The lighting device 580 may continue to control (e.g., periodically control) the emitted light from time $t_2$ until 560*n* (e.g., the end of the show, at time $t_n$) based on the target intensity level and/or target color defined by the show information and/or the auxiliary information that is stored in memory. Accordingly, the lighting device 580 may be configured to control the drive circuit for controlling the intensity level and color of the emitted light from the emitter with respect to time over a time duration $T_{SHOW}$ based on the show and the auxiliary information stored in the memory of the lighting device based on the reception of a (e.g., single) command to execute the show. Stated another way, the lighting device 580 may be configured to control a drive circuit of the lighting device 580 for controlling the intensity level and the color of the cumulative light emitted from one or more emitters of the lighting device 580 at a plurality of different times during the time duration $T_{SHOW}$ for the show.

As noted above, the procedure 550 may be configured to be executed by each of a plurality of lighting devices. In such examples, the plurality of lighting devices may be configured to coordinate the start of the show based on the reception of a single command (e.g., the command transmitted by the computing device 570 at 556). Further, each lighting device 580 out of the plurality of lighting devices may be configured with show information (e.g., a default show) and auxiliary information. The auxiliary information may be specific for (e.g., unique to) each respective lighting device. As such, each lighting device of the plurality of lighting devices may be configured to emit light having slightly different characteristics (e.g., intensity, color, etc.) such that the combination of emitted light from all of the lighting devices generates a coordinate show.

For instance, each lighting device may be configured to apply the auxiliary information to the show information to generate a counterpart show. The show information may define a default show and the auxiliary information may define some alteration to the default show. As such, the counterpart show may be defined as the combination of the show information (e.g., common to all lighting devices) and the auxiliary information (e.g., which may be specific to each lighting device). In response to receiving the command to execute the show, each lighting device may drive one or more emitters to emit light at a plurality of different intensity levels and/or colors with respect to time over a time duration $T_{SHOW}$ based on the show information and the auxiliary information (e.g., the respective counterpart show stored in memory in each lighting device). When the plurality of lighting devices all emit light according to their respective counterpart shows simultaneously, the plurality of lighting devices may generate the show.

Finally, although described with reference primarily to various characteristics of emitted light, the procedure 550 may be executed by devices that control characteristics of other load types, such as those described herein (e.g., speakers, motorized window treatments, etc.). Such non-lighting control devices may be configured to receive the show information and the auxiliary information. However, in such examples, the show information may define a relationship of a characteristic of the load type of the control device (e.g., frequency and/or volume of emitted sound from a speaker, position of a motorized window treatment, etc.) over time (e.g., over the time duration $T_{SHOW}$ of the show). Similarly, the auxiliary information may define some device-specific adjustment to one or more of the characteristics (e.g., adjustment to frequency and/or volume). The non-lighting control devices may be configured to store the show information and/or the auxiliary information in memory prior to the reception of a command to execute the show. Accordingly, some systems may include lighting control device and non-lighting control devices, and computing device (e.g., system controller) may be configured to coordinate a plurality of loads of various types to execute a show that includes, for example, the emission of light, the generation of sound, the movement of one or more objects (e.g., motorized window treatments in the space), etc., for example, based on the reception of a command (e.g., a single command).

Figure 6A:
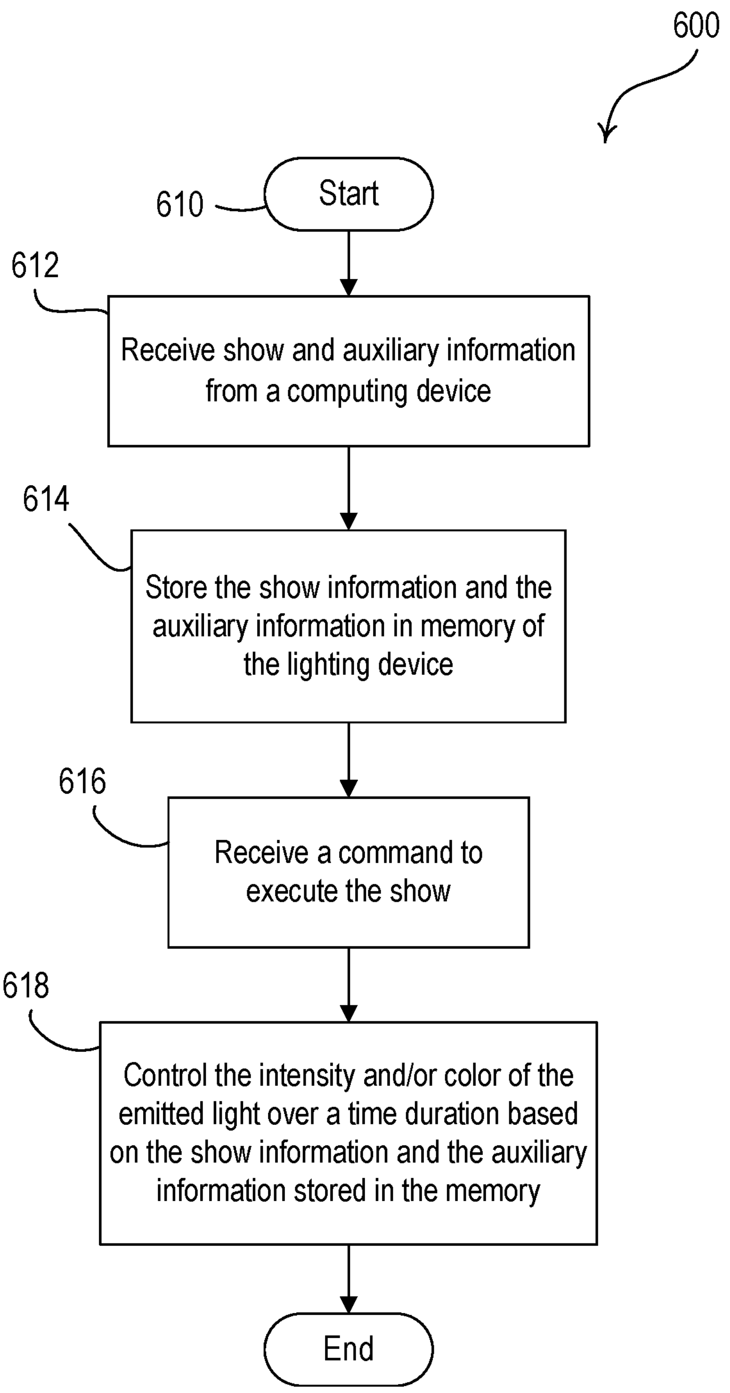
FIG. 6A is a flowchart of an example procedure for generating a show with a lighting device of a lighting system.

FIG. 6A is a flowchart of an example procedure 600 for generating a show with a lighting device of a lighting control system. The procedure 600 may be performed by a lighting device, such as the lighting device 100 shown in FIG. 1A, the lighting fixture 110*a*-110*d* of FIG. 1B, the lighting device 300 shown in FIG. 3, and/or the lighting device 580 of FIG. 5. The procedure 600 may be performed by a control circuit of the lighting device (e.g., the lighting device control circuit 340). The control circuit may perform the procedure 600 periodically and/or in response to receiving show information and/or auxiliary information.

The control circuit may perform the procedure 600 to cause one or more emitters of the lighting device to emit light according to a show. As described herein, in some instances, the show may be a combination of light emitted from a plurality of lighting devices, where each lighting device emits light according to respective counterpart shows, and the combination of all counterpart shows generates the show. Accordingly, using the procedure 600, the control circuit may be configured to receive and store show information and/or auxiliary information that, for example, may be used to enable a plurality of lighting devices to put on the coordinated show. The show information may define predefined illumination content that is stored in memory of the lighting device prior to the reception of the command to execute the show. For example, the predefined illumination content may include illumination instructions that causes the plurality of lighting devices to emit light that mimics a cycling rainbow, mimics candlelight flickers, mimics sunlight shining through a forest canopy, mimics a beathing pattern (e.g., yoga/meditation/workout), or mimics a weather event (e.g., clouds moving, lightning striking, aurora borealis, night sky, etc.). The auxiliary information may be specific for (e.g., unique to) each lighting device. The lighting device may be configured to generate the counterpart show using the show information and the auxiliary information.

The procedure 600 may start at 610. At 612, the control circuit may receive show information and auxiliary information from a computing device, such as a mobile device, such as a smart phone, a tablet, and/or a system controller. At 614, the control circuit may store the show information and the auxiliary information in memory of the lighting device (e.g., non-volatile and/or long-term memory). The show information may define relationships between one or more characteristics of the light (e.g., an intensity value and/or one or more color values, such as a CCT value, XY chromaticity coordinate values, and/or RGB values, etc.) with respect to time over a time duration $T_{SHOW}$ for the show. As such, the lighting device may have stored thereon (e.g., in non-volatile and/or long-term memory) a complete mapping between a plurality of different intensity values with respect to time over the time duration $T_{SHOW}$ of the show and/or a plurality of different color values with respect to time over the time duration $T_{SHOW}$ of the show. Therefore, after the reception of the show information and/or auxiliary information, the control circuit does not, for example, need to stream a plurality of distinct intensity values and/or color values when executing the show.

The show information may be defined by one or more tracks (e.g., default tracks). A track may define a relationship of a characteristic (e.g., a single characteristic) of the light emitted from the one or more emitters (e.g., an intensity value and/or one or more color values, such as a CCT value, XY chromaticity coordinate values, and/or RGB values, etc.) over time. For example, the show information may define a first track that defines an intensity level over time $L_{SHOW}(t)$ for the show. In addition, the show information may define one or more other tracks that define the color (e.g., CCT value, XY chromaticity coordinate values, and/or RGB values) over time. For example, the one or more other tracks that define the color over time may comprise a CCT value over time $T_{SHOW}(t)$. In addition, the one or more other tracks that define the color over time may comprise an x-chromaticity coordinate value over time $X_{SHOW}(t)$ and a y-chromaticity coordinate value over time $Y_{SHOW}(t)$. Further, the one or more other tracks that define the color over time may comprise a red value over time $R_{SHOW}(t)$, a green value over time $G_{SHOW}(t)$, and a blue value over time $B_{SHOW}(t)$. Accordingly, the show information may define a relationship of one or more characteristics of emitted light (e.g., intensity value, CCT value, XY chromaticity coordinate values, RGB values, etc.) with respect to time over a time duration $T_{SHOW}$ for the show.

In some examples, the tracks defined by the show information may be generated using one or more functions. One example of a function that may be used to generate the tracks is a spline function, such as a basis spline function (e.g., a B-spline function). Each function (e.g., splines) may define a relationship of a characteristic of emitted light with respect to time over a time duration $T_{SHOW}$ for the show. For instance, the show information may include a plurality of splines, and the lighting device may be configured to generate a default show based on the one or more splines. For example, the spline function may be a piecewise polynomial function defined by a number of breakpoints (e.g., knots) when the pieces of the function connect. For instance, the show information may include a plurality of breakpoints for the spline function for each track defined by the show information, and the lighting device may be configured to generate the default tracks (e.g., $L_{SHOW}(t)$, $T_{SHOW}(t)$, [$X_{SHOW}(t)$, $Y_{SHOW}(t)$], [$R_{SHOW}(t)$, $G_{SHOW}(t)$, $B_{SHOW}(t)$], etc.) based on the breakpoints and using the spline function. For example, when the show includes a plurality of lighting devices, the show information transmitted to each of the lighting devices may be identical, such that the lighting devices are able to generate the same default tracks for the show.

The auxiliary information may be specific for the lighting device. For example, different auxiliary information may be provided to at least one other lighting device that is also configured to generate the show (e.g., to emit light according to the show information). The auxiliary information may include a time duration $T_{SHOW}$, a time offset value $t_{OFF}$, a frequency adjustment value, and/or an intensity adjustment value associated with the show. The time duration $T_{SHOW}$ may indicate the length in time of each of the tracks of the counterpart shows. The time offset value $t_{OFF}$ may indicate a time delay that the lighting device is to apply to start of the show relative to the receipt of a command to execute the show. For instance, the lighting device may be configured, via the time offset value $t_{OFF}$, to start the show at a different time than one or more other lighting devices that are also configured to execute the show in response to the command (e.g., the same command). For example, the intensity track of a counterpart show may define an intensity level over time $L_{CP}(t)$, where $L_{CP}(t)=L_{SHOW}(t+t_{OFF})$. The frequency adjustment value may indicate whether the lighting device is to repeat the show and/or may indicate an adjustment to the frequency of which the lighting device repeats the show. In some examples, the frequency adjustment value may be a frequency adjustment scalar $\alpha_{FREQ}$, such that the intensity track of a counterpart show may define an intensity level over time $L_{CP}(t)$, where $L_{CP}(t)=L_{SHOW}([\alpha_{FREQ}\cdot f_{INIT}]\cdot t)$ and $f_{INIT}$ is an initial frequency of the show.

The intensity adjustment value may indicate a change in the intensity level over time $L_{CP}(t)$ of the intensity track of the counterpart show (e.g., as compared to the default track defined by the show information) that the lighting device is to apply when controlling the intensity level of the light emitted from the one or more emitters over the time duration $T_{SHOW}$ for the show. For example, the show information may indicate the default track, and the lighting device may be configured to generate the intensity track of the counterpart show based on the intensity adjustment value, for instance, so that the intensity level of the lighting device is different than the intensity level of the light emitted by one or more other lighting devices that are also configured to execute the show. For example, the intensity adjustment value may be an intensity adjustment offset $L_{OFF}$, which may be added to the intensity levels over time $L_{SHOW}(t)$ indicated by the default show to generate the intensity level over time $L_{CP}(t)$ of the intensity track of the counterpart show, e.g., $L_{CP}(t)=L_{SHOW}(t)+L_{OFF}$. For example, the intensity adjustment value may be an intensity adjustment scalar $L_{SC}$, which may be multiplied by the intensity levels over time $L_{SHOW}(t)$ indicated by the default show to generate the intensity level over time $L_{CP}(t)$ of the intensity track of the counterpart show, e.g., $L_{CP}(t)=L_{SC}\cdot L_{SHOW}(t)$.

At 616, the control circuit may receive a command to execute the show. The command may be received from a computing device, such as a mobile device, a dimmer switch, and/or system controller. For instance, the control circuit may receive the command directly or indirectly from the computing device and/or receive the command from another device, such as a dimmer switch. In some instances, the control circuit may receive the show information, the auxiliary information, and/or the command over a wireless communication channel. In response to receiving the command at 616, the control circuit may retrieve the show information and/or the auxiliary information from memory (e.g., non-volatile and/or long-term memory) of the lighting device.

At 618, the control circuit may control a drive circuit of the lighting device to control the intensity level and the color of the light emitted from the one or more emitters to generate the show. As such, the intensity level and the color of the light emitted from the one or more emitters may be a function of the show information and the auxiliary information stored in the memory at 614. Accordingly, the control circuit may control, in response to the command and based on the show information and the auxiliary information stored in the memory, the drive circuit for controlling the intensity level and the color of the light emitted from the one or more emitters with respect to time over the time duration $T_{SHOW}$ defined by the auxiliary information. The control circuit may be configured to control the one or more emitters to emit light at the intensity level and/or color defined by the show information and the auxiliary information throughout the entire length of the time duration $T_{SHOW}$ of the show, for example, based on the reception of a command (e.g., a single command) to execute the show. Accordingly, using the procedure 600, the control circuit may execute the show without having to receive streams of discrete instructions from one or more external computing devices (e.g., such as what is required by the procedure 500).

The control circuit may be configured to start the show based on the reception (e.g., the time of the reception) of the command to execute the show (e.g., at 616). As such, the start time of the show may be relative to a time that the command to execute the show is received by the control circuit. Further, in some examples, the lighting device 580 may be configured to be coupled to an AC power source for receiving an AC mains line voltage. In such examples, the control circuit may be configured execute the show in response to the reception of the command to execute the show and based on one or more zero-crossings of the AC main line voltage. For instance, the zero-crossings of the AC main line voltage may be used as a common timing mechanism so that a plurality of different lighting devices may coordinate the start of the show.

As noted above, the procedure 600 may be configured to be executed by a plurality of lighting devices. In such examples, the plurality of lighting devices may be configured to coordinate the start of the show based on the reception of a single command. Further, each lighting device of the plurality of lighting devices may be configured with show information (e.g., a default show) and auxiliary information. The auxiliary information may be specific for (e.g., unique to) each respective lighting device in the show. As such, each lighting device of the plurality of lighting devices may be configured to emit light having slightly different characteristics (e.g., intensity level, color, etc.) such that the combination of emitted light from all of the lighting devices generates a coordinate show.

For instance, each lighting device may be configured to apply the auxiliary information to the show information to generate a counterpart show. The show information may define a default show and the auxiliary information may define some alteration to the default show. As such, the counterpart show may be defined as the combination of the show information (e.g., common to all lighting devices) and the auxiliary information (e.g., which may be specific to each lighting device). In response to receiving the command to execute the show, each lighting device may drive one or more emitters to emit light at a plurality of different intensity levels and/or colors with respect to time over a time duration $T_{SHOW}$ based on the show information and the auxiliary information (e.g., the respective counterpart show stored in memory in each lighting device). When the plurality of lighting devices all emit light according to their respective counterpart shows simultaneously, the plurality of lighting devices may generate the show.

In some examples, a user may be configured to adjust a characteristic of the emitted light (e.g., raise or lower intensity level, adjust color, etc.) during the show. For example, the control circuit may be configured to receive an adjustment command (e.g., an intensity level adjustment command, a color adjustment command, etc.) while the control circuit is executing the show (e.g., during the time duration $T_{SHOW}$ defined by the auxiliary information). The control circuit may be configured to control the drive circuit for adjusting the characteristic of the light emitted from the one or more emitters during the time duration $T_{SHOW}$ of the show based on the adjustment command (e.g., and further based on the show information and the auxiliary information stored in the memory). An adjustment command may include a command to adjust a characteristic of the emitted light, such as the intensity level or the color of the emitted light, that is to be performed along with the show information and/or the auxiliary information. That is, the adjustment command may be used to adjust the intensity level and/or color of the show information and the auxiliary information. For example, the control circuit may be configured to determine the amount of adjustment of the intensity level (e.g., the intensity adjustment value, which, in some examples, may serve as a base intensity level for the show) in response to actuations of raise/lower actuators (e.g., intensity adjustment actuators) of a dimmer switch.

Finally, although described with reference primarily to various characteristics of emitted light, the procedure 600 may be executed by devices that control characteristics of other load types, such as those described herein (e.g., speakers, motorized window treatments, etc.). Such non-lighting control devices may be configured to receive the show information and the auxiliary information. However, in such examples, the show information may define a relationship of a characteristic of the load type of the control device (e.g., frequency and/or volume of emitted sound from a speaker, position of a motorized window treatment, etc.) over time (e.g., the time duration $T_{SHOW}$ of the show). Similarly, the auxiliary information may define some device-specific adjustment to one or more of the characteristics (e.g., adjustment to frequency and/or volume). The non-lighting control devices may be configured to store the show information and/or the auxiliary information in memory prior to the reception of a command to execute the show. Accordingly, some systems may include lighting control device and non-lighting control devices, and computing device (e.g., system controller) may be configured to coordinate a plurality of loads of various types to execute a show that includes, for example, the emission of light, the generation of sound, the movement of one or more objects (e.g., motorized window treatments in the space), etc., for example, based on the reception of a command (e.g., a single command).

Figure 6B:
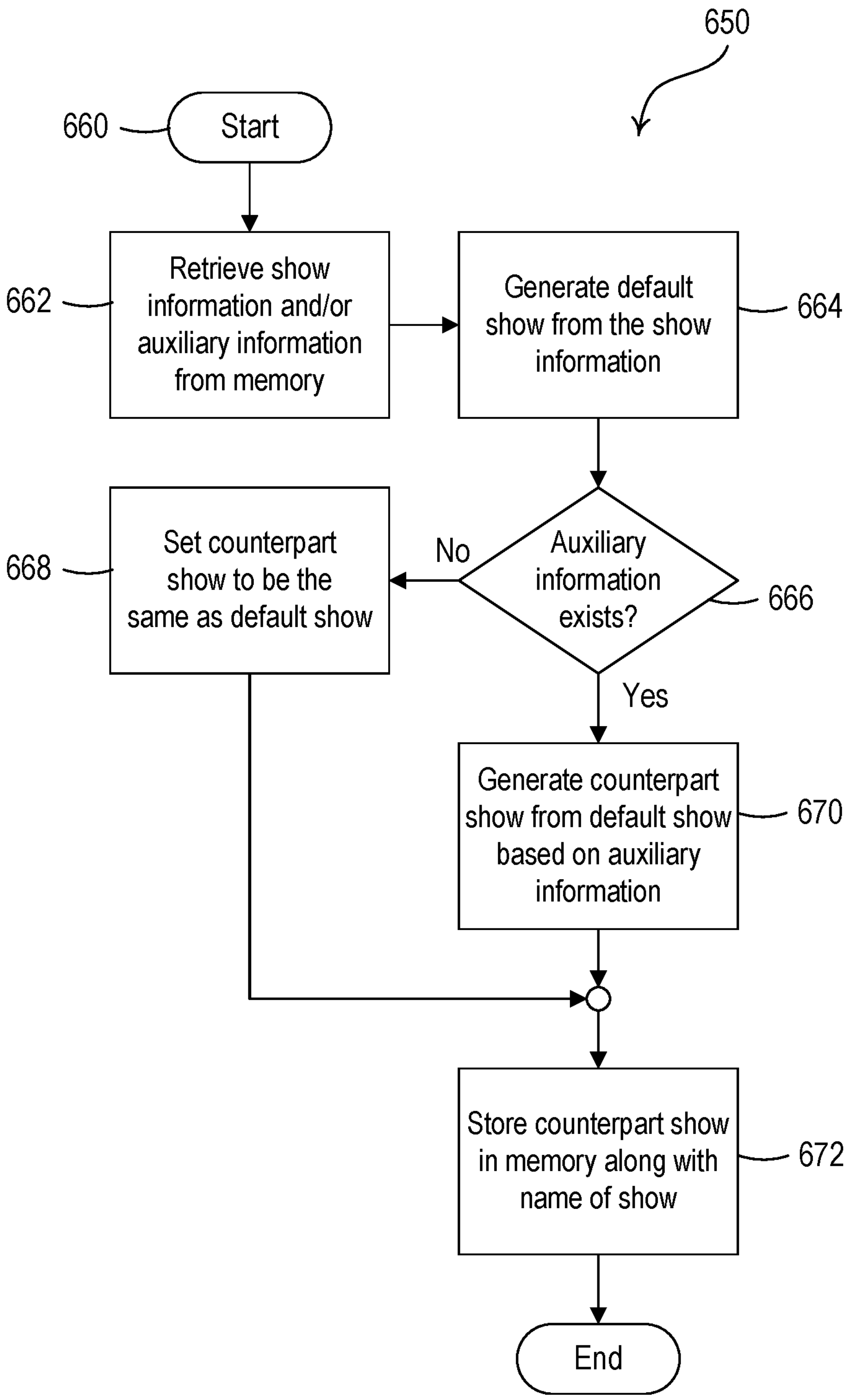
FIG. 6B is a flowchart of an example procedure for generating and storing a counterpart show with a lighting device of a lighting control system.

FIG. 6B is a flowchart of an example procedure 650 for generating and storing a counterpart show with a lighting device of a lighting control system. The procedure 650 may be performed by a lighting device, such as the lighting device 100 shown in FIG. 1A, the lighting fixture 110*a*-110*d* of FIG. 1B, the lighting device 300 shown in FIG. 3, and/or the lighting device 580 of FIG. 5. The procedure 650 may be performed by a control circuit of the lighting device (e.g., the lighting device control circuit 340). The control circuit may perform the procedure 650 in response to receiving show information and/or auxiliary information, and/or in response to receiving instructions to execute a show. For example, the control circuit may perform the procedure 650 after receiving the show information and the auxiliary information.

The control circuit may perform the procedure 650 to generate a counterpart show (e.g., one or more counterpart tracks). As described herein, the counterpart show may be defined by a combination of the show information and the auxiliary information received by the lighting device. For instance, the lighting devices may be configured to generate respective counterpart shows, where the combination of all counterpart shows may make up the show.

The procedure 650 may start at 660. At 662, the control circuit may retrieve the show information and/or the auxiliary information from memory of the lighting device. At 664, the control circuit may generate a default show using the show information. As noted herein, a plurality of lighting devices may receive the same show information, and as such, the show information may define a default show. Further, in some examples, the show information may be defined by one or more tracks (e.g., default tracks). A track may define a relationship of a characteristic (e.g., a single characteristic) of the light emitted from the one or more emitters (e.g., an intensity value and/or one or more color values, such as a CCT value, XY chromaticity coordinate values, and/or RGB values, etc.) over time. In some examples, the tracks defined by the show information may be generated using one or more functions. One example of a function that may be used to generate the tracks is a spline function, such as a basis spline function (e.g., a B-spline function). Each function (e.g., splines) may define a relationship of a characteristic of emitted light with respect to time over the time duration $T_{SHOW}$ for the show. For instance, the show information may include a plurality of splines, and the lighting device may be configured to generate the default show based on the one or more splines.

At 666, the control circuit may determine whether the lighting device has received and/or stored auxiliary information (e.g., related to the show information). For instance, as noted here, the auxiliary information may define one or more characteristics that are specific for (e.g., unique to) each lighting device. For example, the auxiliary information may include a time duration $T_{SHOW}$, a time offset value $t_{OFF}$, a frequency adjustment value, and/or an intensity adjustment value associated with the show information.

If the control circuit determines that auxiliary information exists at 666, the control circuit may generate a counterpart show from the default show based on the auxiliary information at 670. That is, the control circuit may generate a counterpart show that is specific to the lighting device based on the show information (e.g., or default track) and the auxiliary information. As noted herein, the auxiliary information may include a time duration $T_{SHOW}$, a time offset value $t_{OFF}$, a frequency adjustment value, an intensity adjustment value associated with the show, and/or a color offset associated with the show. For example, the counterpart show may define an intensity level over time $L_{CP}(t)$, where $L_{CP}(t)=L_{SHOW}(t+t_{OFF})$. The frequency adjustment value may be a frequency adjustment scalar $\alpha_{FREQ}$, such that the intensity track of a counterpart show may define an intensity level over time $L_{CP}(t)$, where $L_{CP}(t)=L_{SHOW}([\alpha_{FREQ}\cdot f_{INIT}]\cdot t)$ and $f_{INIT}$ is an initial frequency of the show. The color offset may indicate a change to the color defined by the show information. The intensity adjustment value may indicate a change in the intensity level over time $L_{CP}(t)$ of the intensity track of the counterpart show (e.g., as compared to the default track defined by the show information) that the lighting device is to apply when controlling the intensity level of the light emitted from the one or more emitters over the time duration $T_{SHOW}$ for the show. At 672, the control circuit may store the counterpart show in memory along with a name of the show, and the procedure 650 may exit.

However, if the control circuit determines that auxiliary information does not exist at 666, the control circuit may set the counterpart show to be the same as the default show based on the auxiliary information at 668 (e.g., for animated images). At 672, the control circuit may store the counterpart show in memory along with the name of the show, and the procedure 650 may exit. Accordingly, using the procedure 650, the control circuit may be configured to generate a counterpart show to be used during a show based on show information, and if received, associated auxiliary information.

Figure 7:
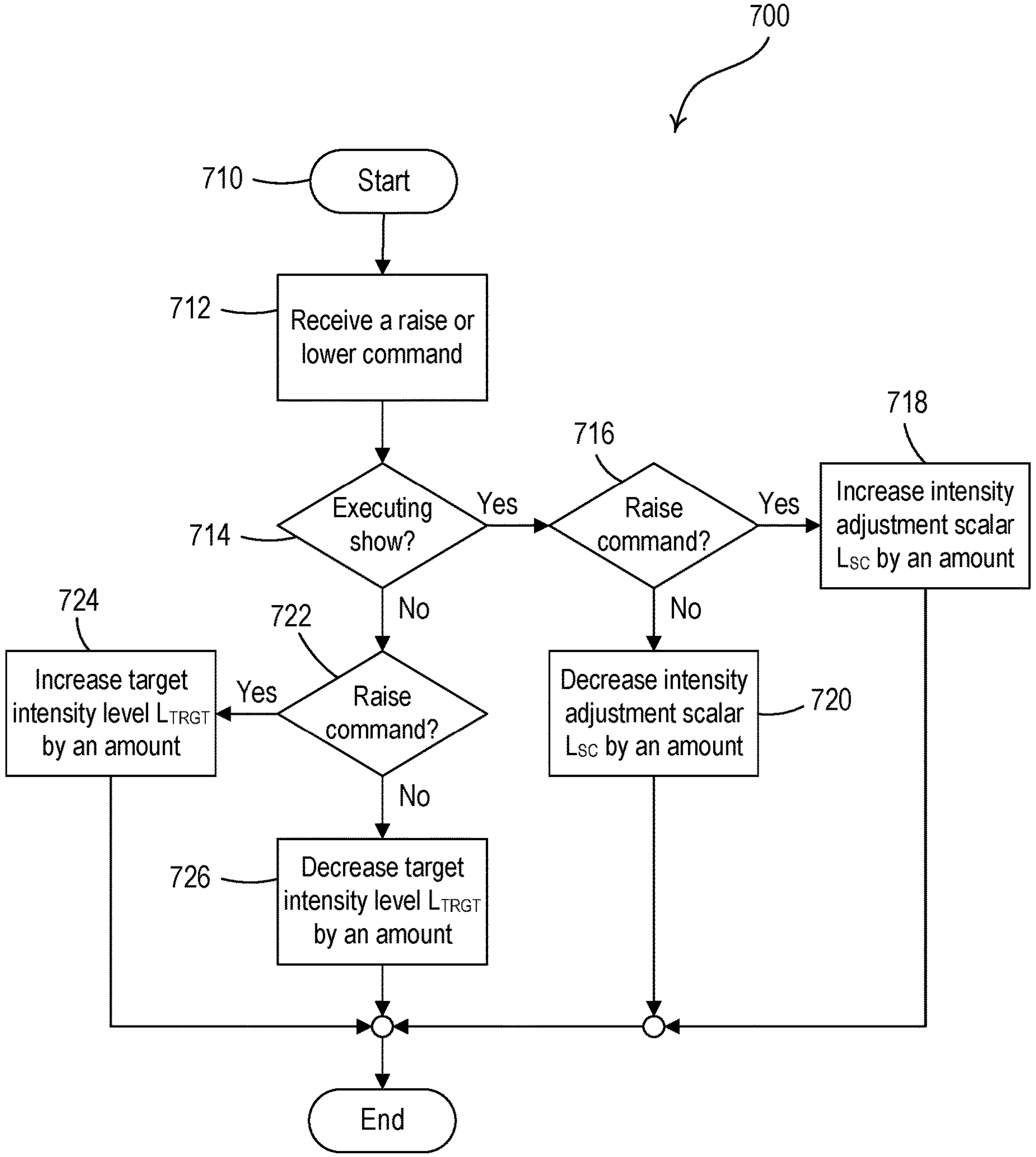
FIG. 7 is a flowchart of an example procedure for responding to a raise or lower command with a lighting device of a lighting control system.

FIG. 7 is a flowchart of an example procedure 700 for responding to a raise or lower command with a lighting device of a lighting control system. The procedure 700 may be performed by a lighting device, such as the lighting device 100 shown in FIG. 1A, the lighting fixture 110*a*-110*d* of FIG. 1B, the lighting device 300 shown in FIG. 3, and/or the lighting device 580 of FIG. 5. The procedure 700 may be performed by a control circuit of the lighting device (e.g., the lighting device control circuit 340). The control circuit may perform the procedure 700 in response to receiving an adjustment command (e.g., via a toggle actuator of the lighting device).

The control circuit may perform the procedure 700 to adjust a characteristic of the emitted light (e.g., raise or lower the intensity level), such as while executing a show or while not executing a show. As described herein, in some instances, the show may be a combination of light emitted from a plurality of lighting devices, where each lighting device emits light according to respective counterpart shows, and the combination of all counterpart shows generates the show. The show information may indicate predefined illumination content that is stored in memory of the lighting device prior to the reception of the command to execute the show. The auxiliary information may be specific for (e.g., unique to) each lighting device. The lighting device may be configured to generate the counterpart show using the show information and the auxiliary information. Using the procedure 700, the control circuit may be configured to adjust a characteristic of the emitted light (e.g., raise or lower intensity level), such as while executing a show or while not executing a show.

The procedure 700 may start at 710. At 712, the control circuit may receive an adjustment command, such as an intensity raise command or an intensity lower command. For example, the user may be configured to adjust the characteristic of the emitted light using an actuator of the lighting device and/or via a graphical user interface (GUI) (e.g., of a computing device and/or external device). Although the procedure 700 is described in context of an intensity raise or an intensity lower command, as noted herein, the adjustment command may be a command to adjust a characteristic of the emitted light, such as a raise intensity command, a lower intensity command, an adjust color command, an adjust start time command, or an adjust frequency command. An adjustment command may include a command to adjust a characteristic of the emitted light, such as the intensity level or the color of the emitted light, that is to be performed along with the show information and/or the auxiliary information. That is, the adjustment command may be used to adjust the intensity level and/or color of the show information and the auxiliary information. For example, the control circuit may be configured to determine the amount of adjustment of the intensity level (e.g., the raise intensity command or the lower intensity command) in response to an actuation of a raise actuator or a lower actuator (e.g., intensity adjustment actuators), respectively, of a dimmer switch or remote control.

At 714, the control circuit may determine whether the lighting device is executing a show. For example, the control circuit may determine whether the raise or lower command is received while the lighting device is executing a show. When executing a show, the lighting device may control one or more characteristics of the emitted light based on show information and/or auxiliary information. If the control circuit determines that the lighting device is executing a show at 714, the control circuit may determine whether the adjustment command is a raise intensity command or a lower intensity command at 716. Further, as described herein, when executing the show, the control circuit may set the target intensity level based on the counterpart show and the present time (e.g., prior to making an adjustment at 718 or 720).

If the control circuit determines that the adjustment command is a raise intensity command at 716, the control circuit may increase an intensity adjustment scalar $L_{SC}$ by an amount indicated by the raise intensity command at 718, and then the control circuit may exit the procedure 700. In some examples, the raise intensity command may indicate an intensity adjustment that is a fixed amount. In other examples, the raise intensity command may indicate an intensity adjustment scalar $L_{SC}$, which may be multiplied by the intensity levels over time $L_{CP}(t)$ of the intensity track of the counterpart show, e.g., $L_{CP}(t)=L_{SC}\cdot L_{CP}(t)$. Alternatively, the raise intensity command may indicate an intensity adjustment offset Lon, which may be added to the intensity levels over time $L_{CP}(t)$ of the intensity track of the counterpart show, e.g., $L_{CP}(t)=L_{CP}(t)+L_{OFF}$.

If the control circuit determines that the adjustment command is a lower intensity command at 716, the control circuit may decrease an intensity adjustment scalar $L_{SC}$ by an amount indicated by the lower intensity command at 720, and then the control circuit may exit the procedure 700. In some examples, the lower intensity command may indicate an intensity adjustment that is a fixed amount. In other examples, the lower intensity command may indicate an intensity adjustment scalar $L_{SC}$, which may be multiplied by the intensity levels over time $L_{CP}(t)$ of the intensity track of the counterpart show, e.g., $L_{CP}(t)=L_{SC}\cdot L_{CP}(t)$. Alternatively, the lower intensity command may indicate an intensity adjustment offset $L_{OFF}$, which may be subtracted from the intensity levels over time $L_{CP}(t)$ of the counterpart show, e.g., $L_{CP}(t)=L_{CP}(t)+L_{OFF}$.

If the control circuit determines that the lighting device is not executing a show at 714, the control circuit may determine whether the adjustment command is a raise intensity command or a lower intensity command at 722. For example, if not executing the show, the control circuit may set the target intensity level to a static intensity level (e.g., an intensity level that does not change with time). If the control circuit determines that the adjustment command is a raise intensity command at 722, the control circuit may increase the target intensity level $L_{TRGT}$ of the lighting load by an amount indicated by the raise intensity command at 724, and then the control circuit may exit the procedure 700.

If the control circuit determines that the adjustment command is a lower intensity command at 722, the control circuit may decrease the target intensity level $L_{TRGT}$ of the lighting load by an amount indicated by the lower intensity command at 720, and then the control circuit may exit the procedure 700.

Figure 8A:
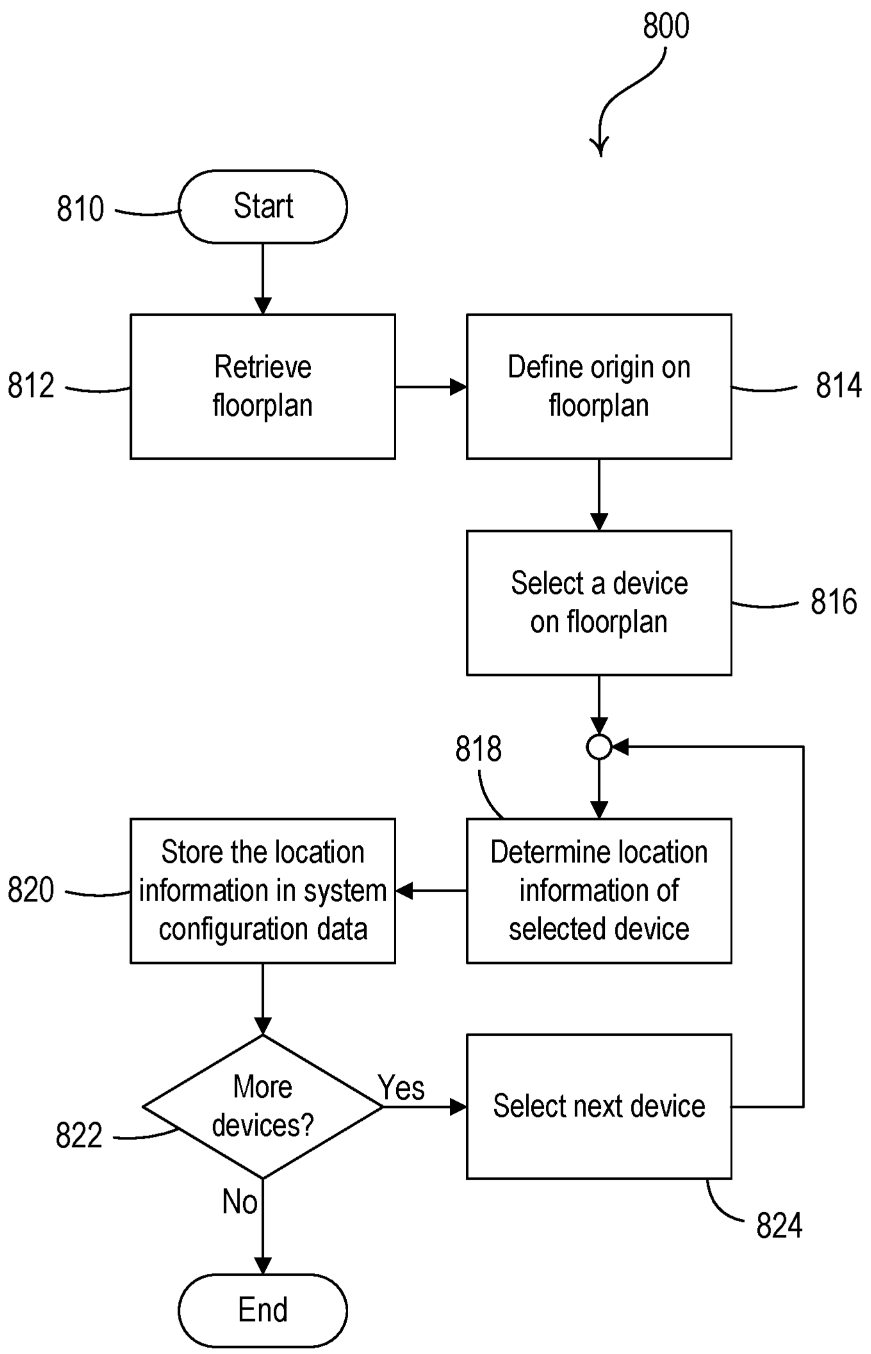
FIG. 8A is a flowchart of an example procedure for assigning a location to one or more lighting devices of a lighting control system.

FIG. 8A is a flowchart of an example procedure 800 for assigning a location to one or more lighting devices of a lighting control system. The procedure 800 may be performed by a device, such as the computing device 160 shown in FIG. 1A, the computing device 150*b* of FIG. 1B, a remote-control device of the lighting control system 100, a system controller of the lighting control system 100, the system controller 140*b* of FIG. 1B, and/or the device 430 of FIG. 4. The procedure 800 may be performed by a control circuit of the device (e.g., the control circuit 431). The control circuit may perform the procedure 800 during an initial configuration of a show. The control circuit may perform the procedure 800 to assign a location to a lighting device using a floorplan. Once the location of the lighting device(s) are assigned, the control circuit may determine auxiliary information for each lighting device so that the plurality of lighting devices are configured to generate a coordinated show.

The control circuit may start the procedure 800 at 810. At 812, the control circuit may retrieve a floorplan of a space. In some examples, the floorplan may include one or more icons that define locations of lighting devices and/or load control devices (e.g., LED drivers) on the floorplan, which may be established during a design phase before installation and commissioning. In some examples, the control circuit may be configured to generate a graphical user interface that displays the floorplan with icons, and the control circuit may be configured to receive user inputs via the graphical user interface that allow for configuring and/or controlling the types and/or the locations of the lighting devices and/or load control devices associated with the icons. Examples of a load control systems that include floorplans are described in greater detail in U.S. Pat. No. 11,687,223, issued Jun. 27, 2023, entitled CONFIGURING A LOAD CONTROL SYSTEM, the entire disclosure of which is hereby incorporated by reference.

At 814, the control circuit may define an origin on the floorplan. For example, the user may select a point on the floorplan to be set as the origin using the graphical user interface or the control circuit may default to an origin point. Alternatively, the control circuit (e.g., instructions residing on the memory of the control circuit) may automatically select the location of the origin on the floorplan (e.g., at the center of the floorplan or in the lower, left corner of the floorplan). At 816, the control circuit may select a device, such as a lighting device, on the floorplan (e.g., based on the icon that defines the location of the lighting device). The floorplan may include a plurality of devices that have a predefined location and/or a technician may add devices to the floorplan based on the actual location of the devices within the space.

At 818, the control circuit may determine or assign location information for the selected device. For example, the control circuit may determine the location information using the graphical user interface and/or based on user input. The location information may comprise coordinates, such as X, XY, or XYZ coordinates (e.g., one-dimensional, two-dimensional, or three-dimensional coordinates). For some lighting devices and/or lighting fixtures, such as downlights, lamps, and other points sources, the control circuit may use the location information of the icon of the lighting device and/or load control device on the floorplan. However, for some types of lighting devices, such as linear lighting devices, the lighting device may not have an easily definable location. For instance, linear lighting devices may be extend a large distance, and may not be easily assigned a single location. In such examples, the control circuit may determine the location information based on any combination of the following. The control circuit may determine the location information for a linear lighting device based on the location of load control device (e.g., LED driver) controlling the linear lighting device as a single zone (e.g., the coordinates may be determined to be one end of the linear lighting device or the other). The control circuit may determine the location information for a linear lighting device based on the midpoint of the lighting device. The control circuit may determine the location information for a linear lighting device to be either end of the fixture (e.g., independent of where load control device is located). In some examples, individual segments of a linear lighting device may be individually addressed, and in such instances, the control circuit may determine location information for each individually addressable segment of the linear lighting device.

At 820, the control circuit may store the location information for the device in memory (e.g., the memory 432) of the device (e.g., as system configuration data). At 822, the control circuit may determine whether there are more lighting devices within the lighting control system to assign location information. If there are additional lighting devices, then control circuit may select the next device at 824, and may proceed back to 818. If there are no additional lighting devices, the control circuit may exit the procedure 800.

Figure 8B:
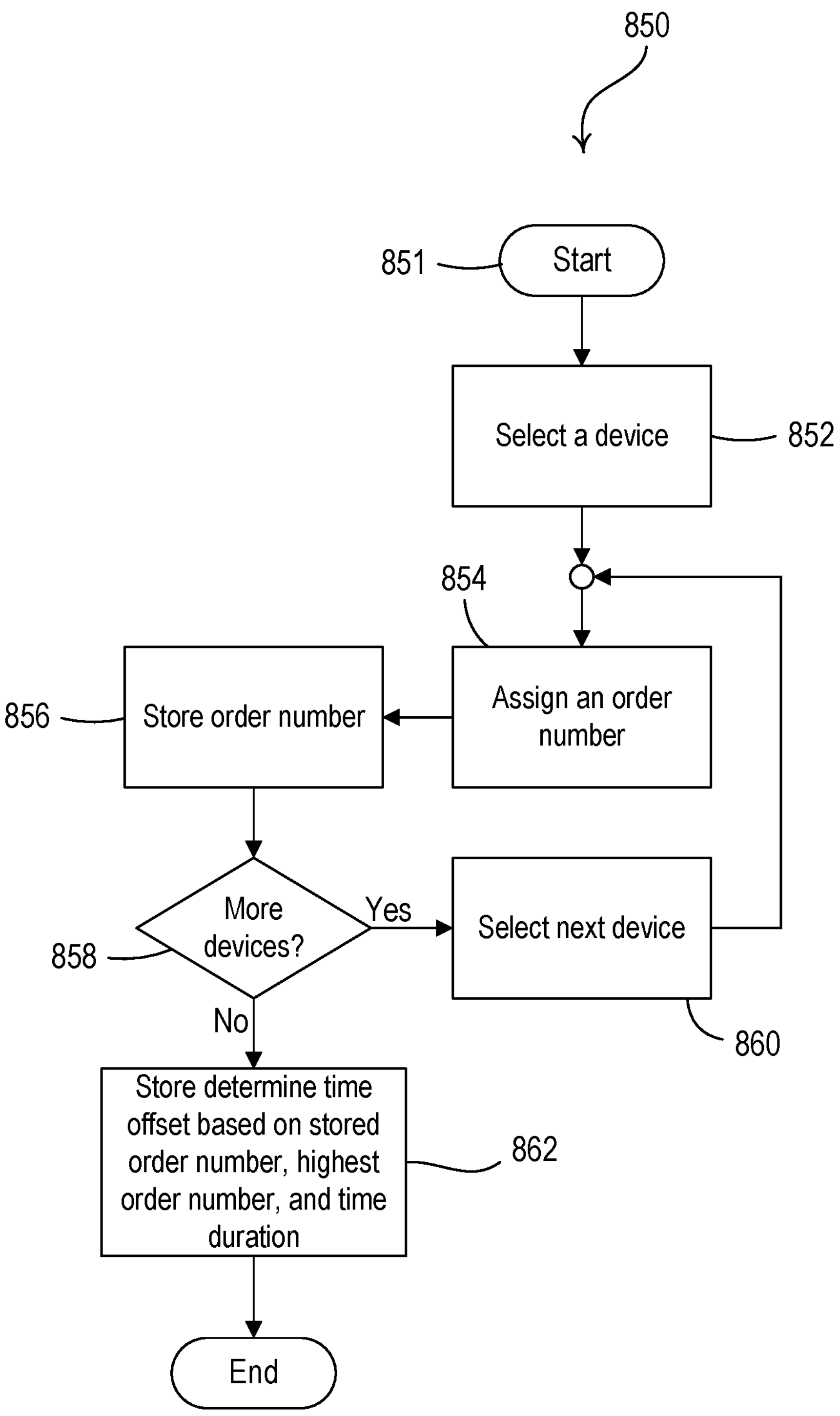
FIG. 8B is a flowchart of an example procedure for assigning an order number to one or more lighting devices of a lighting control system.

FIG. 8B is a flowchart of an example procedure 850 for assigning an order number to one or more lighting devices of a lighting control system. The procedure 850 may be performed by a device, such as the computing device 160 shown in FIG. 1A, the computing device 150*b* of FIG. 1B, a remote-control device of the lighting control system 100, a system controller of the lighting control system 100, the system controller 140*b* of FIG. 1B, and/or the device 430 of FIG. 4. The procedure 850 may be performed by a control circuit of the device (e.g., the control circuit 431). The control circuit may perform the procedure 850 during an initial configuration of a show. The control circuit may perform the procedure 850 to assign an order number $N_{ORDER}$ to a lighting device using a floorplan. Once the order number $N_{ORDER}$ of the lighting device(s) are assigned, the control circuit may determine auxiliary information for each lighting device so that the plurality of lighting devices are configured to generate a coordinated show.

The control circuit may start the procedure 850 at 851. At 852, the control circuit may select a device (e.g., a lighting device) out of the plurality of devices that are within a space. For example, the control circuit may select a device based on a user selection that is received via a user interface (e.g., the user could select a device by selecting an icon on a floorplan). Alternatively, the control circuit may select a devices in the space via a smart phone using Bluetooth low energy (BLE) beaconing.

At 854, the control circuit may assign an order number $N_{ORDER}$ to the device. For example, the control circuit may select an order number $N_{ORDER}$ to the device based on user input (e.g., the user could manually assign an order number by picking one of a number of possible order numbers). The control circuit could select an order number $N_{ORDER}$ to the device itself (e.g., automatically) by assigning the order numbers $N_{ORDER}$ to each device in order (e.g., a first selected device is assigned an order number $N_{ORDER}$ of one, second selected device is assigned an order number $N_{ORDER}$ of two, etc.). The control circuit may assign an order number $N_{ORDER}$ that is unique for the device. Alternatively or additionally, the control circuit may assign multiple devices (e.g., two devices) the same order number $N_{ORDER}$ (e.g., if the devices are within a threshold distance to one another, such as within 6 inches of one another). Further, in some instances, the control circuit may skip an order number $N_{ORDER}$, such as when there might be a large distance between devices (e.g., when the distance between the devices exceeds a threshold distance).

At 856, the control circuit may store the order number $N_{ORDER}$ for the selected device. Further, in some examples, the control circuit may send the order number $N_{ORDER}$ to the device. At 858, the control circuit may determine whether there are more devices within the lighting control system to assign an order number $N_{ORDER}$. If there are additional devices, then control circuit may select the next device at 860, and may proceed back to 854.

If there are no additional devices, the control circuit may determine a time offset $t_{OFF}$ for the plurality of devices within the space at 862. For example, the control circuit may determine a time offset $t_{OFF}$ for a device based on the order number $N_{ORDER}$ of the device, the highest order number $N_{ORDER}$ assigned to any of the plurality of devices within the space, and/or a time duration $T_{SHOW}$ of the show. In some examples, the control circuit may determine a time offset $t_{OFF}$ for a subset of the plurality of devices within the space (e.g., not all devices are necessarily assigned a time offset $t_{OFF}$). The time offset value $t_{OFF}$ may indicate a time delay within the show at which the device is configured to start the show upon receipt of a command to execute the show. For instance, the device may be configured, via the time offset value $t_{OFF}$, to start the show at a different time than one or more other devices that are also configured to execute the show in response to the command (e.g., the same command). For example, the intensity track of a counterpart show may define an intensity level over time $L_{CP}(t)$, where $L_{CP}(t)=L_{SHOW}(t+t_{OFF})$. Further, as described herein, the control circuit may calculate a time offset $t_{OFF}$ depending on the particular order number $N_{ORDER}$ for each device (e.g., the time offset $t_{OFF}$ that is part of the auxiliary information assigned to each device). For instance, the control circuit may calculate a time offset $t_{OFF}$ based on the particular order number $N_{ORDER}$ for the device, a highest order number $N_{HI}$ of the assigned order numbers, and the time duration $T_{SHOW}$ of the show, e.g., $t_{OFF}=(T_{SHOW}/N_{HI})\cdot N_{ORDER}$. Further, at 862, the control circuit may store the time offset $t_{OFF}$ associated with each of the plurality of devices prior to exiting the procedure 850.

In some examples, the show may be generated based on an animated image (e.g., an animated Graphics Interchange Format (GIF) image). An aminated image may be a number of images (e.g., frames) that change with respect to time. For example, a user may select an animated image, and the device (e.g., a control device) may generate show information and auxiliary information based on the numbering of devices, the positioning (e.g., location) of the devices, and/or the types of devices that are configured to generate the show. As noted herein, in some instances, each lighting device may be assigned a location (e.g., within a space or room) and/or a position (e.g., within sequential order of devices). Then, based on the position and/or location of each lighting device, each lighting device may be assigned auxiliary information. In some examples, the show and the auxiliary information may be based on an animated image that is selected by a user.

Figure 9A:
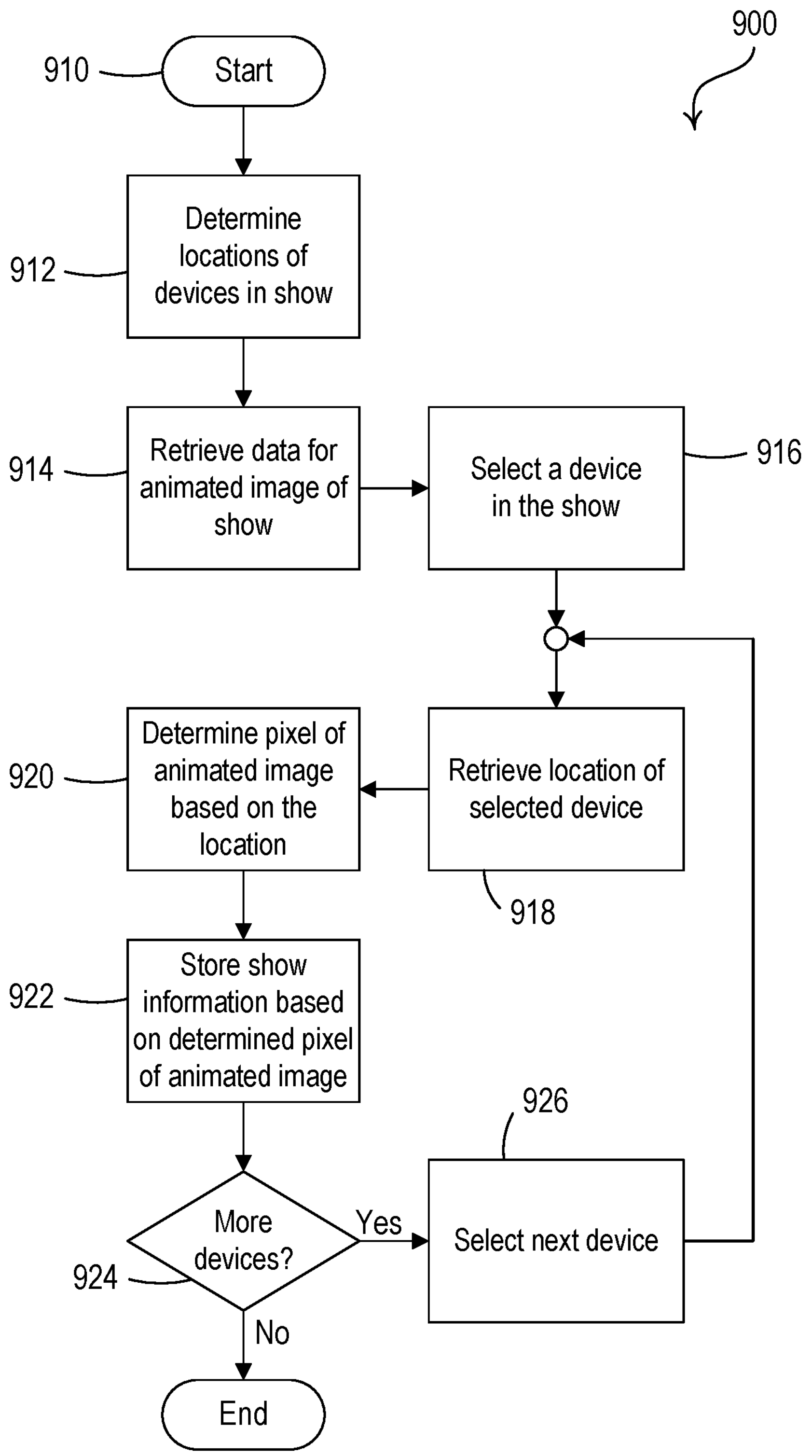
FIG. 9A is a flowchart of an example procedure 900 for assigning show information and auxiliary information for an animated image to one or more lighting devices of a lighting control system.

FIG. 9A is a flowchart of an example procedure 900 for assigning show information and auxiliary information of an animated image to one or more lighting devices of a lighting control system. The procedure 900 may be performed by a device, such as the computing device 160 shown in FIG. 1A, the computing device 150*b* of FIG. 1B, a remote-control device of the lighting control system 100, a system controller of the lighting control system 100, the system controller 140*b* of FIG. 1B, and/or the device 430 of FIG. 4. The procedure 900 may be performed by a control circuit of the device (e.g., the control circuit 431). The control circuit may perform the procedure 900 prior to assigning show information and/or auxiliary information to one or more lighting devices within a space. The control circuit may perform the procedure 900 after locations were assigned to the lighting devices, for example, using a floorplan (e.g., as described with respect to the procedure 800).

The control circuit may start the procedure 900 at 910. At 912, the control circuit may determine location information of one or more devices (e.g., of one or more lighting devices that will execute the show). For example, the control device may determine the location information of the one or more devices using the procedure 900. As noted herein, the location information may be one-dimensional location information, two-dimensional location information, or three-dimensional location information that is associated with a physical location of the device within the space.

At 914, the control circuit may retrieve (e.g., from memory) data for an animated image. The animated image may be associated with a plurality of pixels, and the plurality of pixels may be defined by changing intensity levels and/or colors over time. One example of an animated image is a GIF image. In some examples, the control circuit may receive the animated image from a user (e.g., via a computing device, such as a system controller or mobile device). The data for the animated image may include the number of pixels of the animated image, a time duration of the animated image, and the show information associated with each pixel of the animated image (e.g., a start time for the pixel of the animated image, and/or one or more characteristics of each pixel of the animated image over the time duration, such as the intensity level of a pixel over the time duration of the animated image, the color of the pixel over the time duration of the animated image, etc.). As such, the pixels of the animated image may have unique and/or different show information. In some examples, the control circuit may receive the animated image and generate show information for each pixel of the animated image.

At 916, the control circuit may select a device in the show. For example, the control circuit may select the device based on an ordering of the devices, based on a location of the device within the space, and/or based on user selection. In some examples, the control circuit may assign each device in the system a different order number $N_{ORDER}$, and the control circuit may select the device may on the order number $N_{ORDER}$ associated with the device. At 918, the control circuit may retrieve (e.g., from memory) the location information of the selected device (e.g., as determined at 912).

At 920, the control circuit may determine (e.g., select) a pixel of the animated image based on the location of the selected device. Each frame of the animated image may include a plurality of pixels, and the control circuit may determine a pixel of the plurality of pixels based on the location of the selected device and the location of the pixel within the frame. In some examples, the control circuit may associate the pixels of the animated image into the space in which the lighting devices are located. In some examples, the control circuit may associate each pixel of the animated image with a location within the space. Then, based on locations of the pixels and the location of the selected device, the control circuit may select a pixel based on which pixel has the closest location within the space to the location of the selected device in the space.

At 922, the control circuit may store the show information of the selected pixel with the selected device. Further, in some examples, the control circuit may send the show information of the selected pixel to the selected device for storage at the selected device (e.g., in memory of the selected device). At 924, the control circuit may determine whether there are additional devices that are not yet associated with show information of a pixel of the animated image. If the control circuit determines that there is at least one additional device at 924, the control circuit may select another device at 926 and return to 918. If the control circuit determines that there are no additional devices (e.g., all devices are associated with the show information of a pixel of the animated image), the control circuit may exit the procedure 950. Accordingly, using the procedure 950, the control circuit may associate show information for a plurality of pixels of an animated image with respective devices (e.g., lighting devices) within a space, for example, so that these lighting devices may later execute a show that mimics the animated image.

Figure 9B:
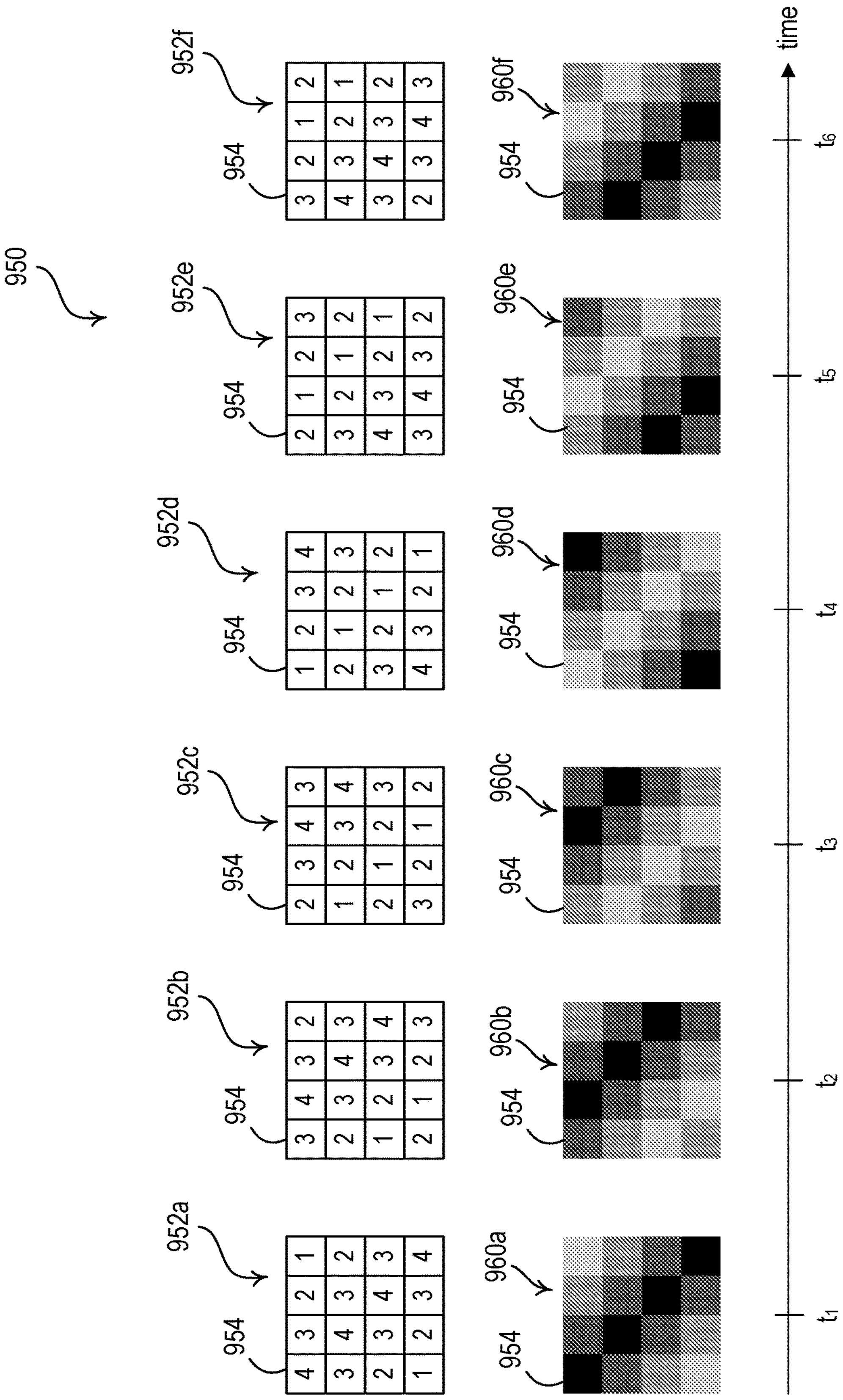
FIG. 9B is a diagram illustrating an example of an animated image.

FIG. 9B is a diagram illustrating an example of an animated image 952. A show, such as the show information and auxiliary information, may be based on the animated image 950. The animated image 950 may be illustrated by a series of six bitmaps 952*a*-952*f* and/or six corresponding images 960*a*-960*f* that progress over time (from time $t_1$ to time $t_6$). The animated image 950 may be defined by sixteen pixels (e.g., each pixel being represented by a smaller box, such as pixel 954). A single pixel, such as pixel 954, may have a different intensity level and/or color over the time duration $T_{SHOW}$ of the animated image 950. For example, the value of the pixel 954 changes across the bitmaps 952*a*-952*f* and may be illustrated by a different shade of grayscale in the corresponding images 960*a*-960*f* as the animated image progresses over time (from time $t_1$ to time $t_6$). At the end of time $t_6$, the animated image may return to time $t_1$ (e.g., a number of consecutive times) or the show may end.

A computing device (e.g., system controller), may be configured to generate and assign show information and/or auxiliary information based on an animated image. In some examples, the animated image may be an animated GIF image. The computing device may be configured to assign each lighting device a location within the space (e.g., using methods described herein). For example, the computing device may assign each lighting device a different order number $N_{ORDER}$. In such examples, the computing device may calculate a time offset $t_{OFF}$ depending on the particular order number $N_{ORDER}$ for each lighting device (e.g., the time offset $t_{OFF}$ that is part of the auxiliary information assigned to each lighting device). For instance, the computing device may calculate a time offset $t_{OFF}$ based on the particular order number $N_{ORDER}$ for the lighting device, a highest order number $N_{HI}$ of the assigned order numbers, and the time duration $T_{SHOW}$ of the show, e.g., $t_{OFF}=(T_{SHOW}/N_{HI})\cdot N_{ORDER}$. Further, in some examples, the computing device may be configured to use inputs received from a mobile device (e.g., augmented reality software) to generate a two-dimensional map of lighting loads within a space. The computing device may assign each lighting device a location within the space, such as XY coordinates, based on the two-dimensional map.

The computing device may allow a user to choose an animated image that represents a show over time across an array. In some instances, the computing device may generate a display on a screen that allows the user to visualize and select an animated image. The user may visualize how a show generated based on the animated image might look in the space by viewing the animated image on the display. The animated image may be associated with a plurality of pixels (e.g., such as the pixel 954 of the animated image 950).

In some examples, the animated image may represent a show over time across a two-dimensional array (e.g., such as the animated image 950). However, although described in context of a two-dimensional array, in other examples, the animated image may represent a show over time across a three-dimensional array (e.g., a three-dimensional volume where locations are defined by XYZ coordinates). Further, in other examples, the animated image may represent a show over time across a one-dimensional array (e.g., where locations are defined by X coordinates). In such examples, the X-coordinate may represent a location along a length of the space.

As noted above, the computing device may associate one or more pixels of the animated image with each of a plurality of different lighting devices. Using the animated image 950 as an example, the animated image may include sixteen pixels, and the computing device may determine which pixel(s) to associate with each lighting device based on the location of the lighting device within the space (e.g., using the floorplan, as described herein). As described herein, the computing device may associate each lighting device to a location (e.g., an XY coordinate) within the space. The computing device may associate each pixel of the animated image with a location within the space. Accordingly, the computing device may associate each pixel with one or more lighting devices. In some examples, there may be more than one pixel associated with a lighting device. For instance, the lighting device may be configured to control the emitted light based on a blend or average of the values of the characteristic(s) associated with the pixels. Alternatively, multiple lighting devices may be associated with a pixel (e.g., based on the number of lighting devices, the number of pixels of the animated image, and the location of the lighting devices within the space). In some examples, the floorplan data may include dimensions of a plurality of areas (e.g., XY coordinates for the corners of areas), such that an animated image can be scaled over the area, or just located/sized with respect to the dimensions of the area.

The computing device may control the plurality of lighting devices based on the animated image and the association between lighting device(s) and pixels of the animated image. For example, the computing device may generate show information and auxiliary information based on the animated image. The show information may be unique to each pixel or location within the space. The computing device may send the show information to each lighting device, and may send auxiliary information to each lighting device that is unique to the coordinates (e.g., position and location) of the lighting device. The system controller may then execute the show, and the lighting devices may control the intensity level and/or color of the emitted light based on the show information and auxiliary information over time to mimic the animated image. That is, the lighting devices may control the intensity level and/or color of their emitted light over time based on their respective location within the space to generate the show based on the animated image. Further, although described in the context of a two-dimensional animated image, in other examples, the computing device may be configured to generate show information and auxiliary information based on a three-dimensional animation, and generate and assign auxiliary information to each lighting device based on the location (e.g., three-dimensional coordinates, such as XYZ coordinates) assigned to the lighting device within the space.

Although described with reference to a lighting load, one or more embodiments described herein may be used with other electrical loads and/or load control devices. For example, one or more of the embodiments described herein may be performed by a variety of load control devices that are configured to control of a variety of electrical load types, such as, for example, a LED driver for driving an LED light source (e.g., an LED light engine); a screw-in luminaire including a dimmer circuit and an incandescent or halogen lamp; a screw-in luminaire including a ballast and a compact fluorescent lamp; a screw-in luminaire including an LED driver and an LED light source; a dimming circuit for controlling the intensity level of an incandescent lamp, a halogen lamp, an electronic low-voltage lighting load, a magnetic low-voltage lighting load, or another type of lighting load; an electronic switch, controllable circuit breaker, or other switching device for turning electrical loads or appliances on and off; a plug-in load control device, controllable electrical receptacle, or controllable power strip for controlling one or more plug-in electrical loads (e.g., coffee pots, space heaters, other home appliances, and the like); a motor control unit for controlling a motor load (e.g., a ceiling fan or an exhaust fan); a drive unit for controlling a motorized window treatment or a projection screen; motorized interior or exterior shutters; a thermostat for a heating and/or cooling system; a temperature control device for controlling a heating, ventilation, and air conditioning (HVAC) system; an air conditioner; a compressor; an electric baseboard heater controller; a controllable damper; a humidity control unit; a dehumidifier; a water heater; a pool pump; a refrigerator; a freezer; a television or computer monitor; a power supply; an audio system or amplifier; a generator; an electric charger, such as an electric vehicle charger; and an alternative energy controller (e.g., a solar, wind, or thermal energy controller). A single control circuit may be coupled to and/or adapted to control multiple types of electrical loads in a load control system.

In addition to what has been described herein, the methods and systems may also be implemented in a computer program(s), software, or firmware incorporated in one or more computer-readable media for execution by a computer (s) or processor(s), for example. Examples of computer-readable media include electronic signals (transmitted over wired or wireless connections) and tangible/non-transitory computer-readable storage media. Examples of tangible/non-transitory computer-readable storage media include, but are not limited to, a read only memory (ROM), a random-access memory (RAM), removable disks, and optical media such as CD-ROM disks, and digital versatile disks (DVDs).

What is claimed is:

1. A lighting device comprising:

one or more light sources, wherein each light source is configured to emit light;

a load control circuit configured to control an amount of power delivered to each of the one or more light sources;

a communication circuit configured to receive messages; and a control circuit for controlling the load control circuit to control an intensity level and a color of the cumulative light emitted by the one or more light sources, wherein the control circuit is configured to:

receive, via the communication circuit, show information and auxiliary information from a computing device in one or more messages;

store the show information and the auxiliary information in memory of the lighting device, wherein the show information is defined by one or more default tracks;

receive, via the communication circuit, a command to execute a show in a message;

generate a counterpart show based on the one or more default tracks and the auxiliary information stored in the memory of the lighting device; and control the load control circuit to control the intensity level and the color of the cumulative light emitted from the one or more light sources with respect to time to generate the counterpart show.

2. The lighting device of claim 1, wherein the show information defines a relationship of intensity values with respect to time over a time duration for the show and at least one relationship of color values with respect to time over the time duration for the show.

3. The lighting device of claim 1, wherein the auxiliary information comprises a time duration, a time offset value, a frequency adjustment value, or an intensity adjustment value.

4. The lighting device of claim 3, wherein each default track defines a relationship of a characteristic of the light emitted from the one or more light sources over time, and wherein the characteristic of the light comprises intensity level or color.

5. The lighting device of claim 4, wherein a default track of the one or more default tracks defines a correlated color temperature (CCT) value over time.

6. The lighting device of claim 4, wherein a default track of the one or more default tracks defines an x-chromaticity coordinate value over time and a y-chromaticity coordinate value over time.

7. The lighting device of claim 4, wherein a default track of the one or more default tracks defines a red value over time, a green value over time, and a blue value over time.

8. The lighting device of claim 1, wherein the control circuit is configured to generate the counterpart show using a spline function that is dependent on the show information and the auxiliary information.

9. The lighting device of claim 8, wherein the show information received by the control circuit includes one or more breakpoints for the spline function.

10. The lighting device of claim 9, wherein the control circuit is configured generate the one or more default tracks using the breakpoints of spline function comprised within the show information, wherein each default track defines a relationship of a characteristic of the light emitted from the one or more light sources over time, and wherein the characteristic of the light comprises intensity level or color.

11. The lighting device of claim 10, wherein the control circuit is configured generate one or more counterpart tracks from the one or more default tracks using the auxiliary information stored in memory, wherein the counterpart show comprises the one or more counterpart tracks.

12. The lighting device of claim 1, wherein the intensity level and the color of the cumulative light emitted from the one or more light sources is determined using a function that is dependent upon the counterpart show.

13. The lighting device of claim 1, wherein the auxiliary information comprises a time duration for the show, and wherein changes to the time duration affect a frequency of the show.

14. The lighting device of claim 1, wherein the auxiliary information comprises a time offset, wherein the time offset indicates a time delay that the lighting device is to apply to start of the show relative to the receipt of the command.

15. The lighting device of claim 1, wherein the control circuit is configured to:

receive an adjustment command during a time duration for the show defined by the auxiliary information, wherein the adjustment command comprises a command to adjust a characteristic of the emitted light, wherein the characteristic of the emitted light comprises the intensity level or the color of the emitted light; and control the load control circuit for adjusting the characteristic of the emitted light during the time duration based on the adjustment command.

16. The lighting device of claim 1, wherein the show information is common to a plurality of lighting devices, and wherein the auxiliary information is specific for the lighting device.

17. The lighting device of claim 1, wherein the auxiliary information comprises a color offset, wherein the color offset indicates a change to the color defined by the show information.

18. The lighting device of claim 1, wherein the auxiliary information is specific for the lighting device, such that different auxiliary information is provided to at least one other lighting device.

19. The lighting device of claim 1, wherein the control circuit is configured to, in response to the command, retrieve the show information and the auxiliary information from the memory of the lighting device prior to controlling the load control circuit to control the intensity level and the color of the cumulative light emitted from the one or more light sources with respect to time to generate the show.

20. The lighting device of claim 1, wherein the show information defines predefined illumination content that is stored in memory of the lighting device prior to the reception of the command to execute the show; and wherein the predefined illumination content comprising illumination instructions that causes the plurality of lighting devices to emit light that mimics a cycling rainbow, mimics candlelight flickers, mimics sunlight shining through a forest canopy, mimics a beathing pattern, or mimics a weather show.

* * * * *